(12) United States Patent
Tsukiyama et al.

(10) Patent No.: US 8,690,220 B2
(45) Date of Patent: Apr. 8, 2014

(54) STRUCTURE OF LIFT GATE FOR VEHICLE

(75) Inventors: Natsuki Tsukiyama, Hiroshima (JP);
Koichi Matsumoto, Hiroshima (JP);
Issei Harima, Hiroshima (JP); Naoyuki Ikemizu, Hiroshima (JP); Tsuyoshi Igura, Hiroshima (JP); Junichiro Yamashita, Hiroshima (JP)

(73) Assignees: Mazda Motor Corporation, Hiroshima (JP); DaikyoNishikawa Corporation, Hiroshima (JP)

( * ) Notice: Subject to any disclaimer, the term of this patent is extended or adjusted under 35 U.S.C. 154(b) by 0 days.

(21) Appl. No.: 13/408,517

(22) Filed: Feb. 29, 2012

(65) Prior Publication Data

US 2012/0248814 A1 Oct. 4, 2012

(30) Foreign Application Priority Data

Mar. 30, 2011 (JP) .................................. 2011-073915

(51) Int. Cl.
*B60J 5/10* (2006.01)
(52) U.S. Cl.
USPC ...... 296/56; 296/106; 296/901.01; 296/146.8
(58) Field of Classification Search
USPC ............... 296/56, 106, 146.8, 901.01; 49/501
See application file for complete search history.

(56) References Cited

U.S. PATENT DOCUMENTS

| 4,822,098 A * | 4/1989 | Vogt et al. .................. 296/146.5 |
| 2012/0280533 A1* | 11/2012 | Gachter et al. ............. 296/146.8 |

FOREIGN PATENT DOCUMENTS

| EP | 340180 A1 * | 11/1989 |
| JP | 2005-239062 A | 9/2005 |
| JP | 2009-067360 A | 4/2009 |
| JP | 2011-057119 A | 3/2011 |

* cited by examiner

*Primary Examiner* — Dennis Pedder
*Assistant Examiner* — Beverly Becker
(74) *Attorney, Agent, or Firm* — Studebaker & Brackett PC

(57) ABSTRACT

An inner panel of a lift gate includes an outer-frame forming portion comprising a pair of side edge frame portions including a pair of pillar portions and a lower end frame portion integrally formed at the side frame portions, an inner-frame forming portion formed at a lower edge portion of a window opening to connect to the outer-frame forming portion, and a panel portion covering over a portion enclosed by the outer-frame forming portion and the inner-frame forming portion. The panel portion comprises an outside panel portion provided to contact the outer panel and an inside panel portion integrally formed at the outside panel portion to connect to the outside panel portion and project toward a vehicle-compartment side beyond the outside panel portion and connects to the outer-frame forming portion and the inner-frame forming portion of said inner panel.

12 Claims, 22 Drawing Sheets

STRUCTURE OF LIFT GATE FOR VEHICLE

BACKGROUND OF THE INVENTION

The present invention relates to a structure of a lift gate for a vehicle which is provided to open or close an opening portion formed at a rear portion of the vehicle, in particular, which comprises an inner panel and an outer panel which are made from synthetic resin.

Conventionally, a lift gate provided to open or close an opening portion formed at a rear portion of a hatch back type of passenger vehicle or the like comprises an inner panel and an outer panel which are made of a steel plate and joined to each other at their respective outer edge end portions. Herein, since the weight of a vehicle body influences the fuel consumption (fuel economy) of the vehicle considerably, developments of making the lift gate from synthetic resin have been actively conducted for reduction of the vehicle-body weight. The synthetic-resin made inner and outer panels can make the vehicle-body weight more lightweight than the steel-plate made inner and outer panels. Further, the synthetic-resin made outer panel enables integral forming of exterior components, such as a spoiler, and the synthetic-resin made inner panel enables integral forming of interior components, such as a trim. Accordingly, the number of vehicle components or manufacturing costs can be reduced properly.

The lift gate is a relatively large-sized member constituting the vehicle body compared with other members, such as a side door or a trunk lid, and rotates greatly around a hinge fixed to a rear header when it opens or closes. Accordingly, the lift gate is required to be made to have a high rigidity against a bending stress and a torsional stress which may be caused by a lift gate's opening or closing operation. Therefore, in making the lift gate from synthetic resin, it has been tried to additionally attach plural reinforcements to specific portions where the bending and torsional stresses concentrate, thereby increase the rigidity of the lift gate properly.

Japanese Patent Laid-Open Publication No. 2009-67360 discloses the lift gate structure for a vehicle, in which the synthetic-resin made outer panel comprises the upper portion including the transparent window portion and the spoiler portion and the lower portion equipped with the license-plate attachment portion, and this outer panel and the synthetic-resin made inner panel are joined to each other at their respective outer edge end portions via the adhesive. Thereby, the window portion can be made from synthetic resin in place of a window glass (windowpane), so that an attachment structure for the window portion can be made simpler and the weight of the lift gate can be reduced.

The lift gate structure disclosed in the above-described patent document comprises the synthetic-resin made rear window which is integrally formed at the outer panel, so that the simple lift-gate structure and the lightweight lift gate can be provided. However, the window opening portion of the lift gate may be designed to have a relatively wide area from perspectives of passenger's comfortableness, better design and the like. Herein, in a case in which this wide window opening portion is made from transparent synthetic resin in place of the window glass (windowpane), since the synthetic resin itself is lighter than the glass, there is a concern that the sufficiently-large rigidity required as the rear window or appropriate accuracy of components may not be obtained. Meanwhile, in a case in which the glass-made rear window (rear windowpane) is used and attached to the synthetic-resin made lift gate, the weight of the rear window glass (rear windowpane) acts on the lift gate in addition to the bending and torsional stresses caused by the lift gate's opening or closing operation, so that the rigidity large enough to properly support these weight and stresses should be required. Accordingly, it may be necessary that the plate thickness of the inner panel and the outer panel is made thicker or some reinforcement is provided additionally.

On the other hand, the outer surface of the outer panel forms a decorative face as an exterior design, so it generally has a relatively smooth and wide face portion compared to the inner panel to which some vehicle equipments are installed. This face portion is likely to generate surface vibrations caused from vehicle vibrations or a dent caused by pressing during the lift gate's opening or closing operation. These surface vibrations or dent may influence the product values of the lift gate improperly. In particular, in a case in which the outer panel is made from synthetic resin, since generations of the surface vibrations or the dent become greater compared to the case of the steel-plate made outer panel, the product values of the lift gate may further deteriorate. Therefore, it may become necessary in order to properly increase the face rigidity of the outer panel that the plate thickness of the outer panel is made thicker or some reinforcing ribs or reinforcements are provided at a back face of the face portion additionally.

However, the increase of the plate thickness or the addition of the reinforcements and the like for increasing the rigidity of the lift gate may cause the weight increase of the lift gate as described above. That is, despite aiming at the lightweight lift gate by making the inner and outer panels from synthetic resin, the weight increase of the lift gate may be caused by the thicker panels or the additional provision of the reinforcements and the like for solving lack of the rigidity. Consequently, there is a concern that the effect of weight reduction by the synthetic-resin made lift gate may improperly decrease.

SUMMARY OF THE INVENTION

An object of the present invention is to provide a structure of a lift gate for a vehicle which can properly improve the rigidity and the product values of the lift gate, making the lift gate properly lightweight.

According to the present invention, there is provided a structure of a lift gate for a vehicle, which is provided to open or close an opening portion formed at a rear portion of the vehicle, comprising a windowpane, a synthetic-resin made inner panel including a window opening portion where the windowpane is attached, and a synthetic-resin made outer panel adhering to a vehicle outside of the inner panel, wherein the inner panel includes an outer-frame forming portion which comprises a pair of side edge frame portions including a pair of right-and-left pillar portions and a lower end frame portion integrally formed at the side edge frame portions and has a U-shaped cross section such that an opening thereof is directed toward the vehicle outside, an inner-frame forming portion which is formed at a lower edge portion of the window opening portion to connect to the outer-frame forming portion and has a U-shaped cross section such that an opening thereof is directed toward the vehicle outside, and a panel portion which covers over a specified portion enclosed by the outer-frame forming portion and the inner-frame forming portion, the panel portion comprising an outside panel portion which is provided to contact the outer panel or be positioned close to the outer panel and an inside panel portion which is integrally formed at the outside panel portion to connect to the outside panel portion and project toward a vehicle-compartment side beyond the outside panel portion and connects to the outer-frame forming portion and the inner-frame forming portion of the inner panel.

According to the structure of a lift gate for a vehicle of the present invention, since the inner panel comprises the pair of side edge frame portions including the pair of right-and-left pillar portions and the lower end frame portion formed integrally at the side edge frame portions and there is also provided the outer-frame forming portion having the U-shaped cross section such that its opening is directed toward the vehicle outside, a continuous U-shaped cross section extending from the upper end portion of one of the pillar portions to the upper end portion of the other of the pillar portions by way of the lower end frame portion can be formed, so that the bending stress acting on the lift gate can be firmly supported. Further, since the outer-frame forming portion has the U-shaped cross section extending, the bending rigidity of the lift gate can be increased. Further, since the inner-frame forming portion connects to the outer-frame forming portion and has the U-shaped cross section with its opening being directed toward the vehicle outside, the inner panel can be formed in a grid shape, thereby increasing the torsional rigidity of the respective side edge frame portions. Also, since the outside panel portion and the inside panel portion continuous from the outside panel portion are formed at the panel portion of the inner panel, the bending and torsional stresses inputted to the outer-frame forming portion and the inner-frame forming portion can be supported and absorbed properly by the whole part of the inner panel. Moreover, in a case in which the outside panel portion contacts the outer panel, the face rigidity of the outer panel can be increased by using the inner panel, so that the surface vibrations or dent can be properly restrained from generating. In a case in which the outside panel portion is positioned close to the outer panel, the outer penal which has been deformed in accordance with the generations of the surface vibrations or the dent may come to contact the outside panel portion, so that the further surface vibrations or dent can be properly restrained from generating. Accordingly, by improving the structure of the inner panel without increasing the plate thickness, the number of reinforcements and the like, the synthetic-resin made lift gate can be made properly lightweight and both the rigidity and the product values of the lift gate can be increased properly.

According to an embodiment of the present invention, the inner panel includes a pair of vertical wall portions which connects to the inner-frame forming portion at a midway position thereof in a vehicle width direction and partitions a space formed between the outer-frame forming portion and a mechanism portion installed to the lift gate into a left side and a right side, the pair of vertical wall portions is formed to have a U-shaped cross section such that an opening thereof is directed toward the vehicle outside, and the outside panel portion is formed to be continuous to at least two adjacent portions among the vertical wall portions, inner-frame forming portion, side edge frame portions, and lower end frame portion of the inner panel. Thereby, since the outside panel portion is continuous to at least the two adjacent portions among the vertical wall portions, inner-frame forming portion, side edge frame portions, and lower end frame portion of the inner panel, the rigidity of the inner panel and the face rigidity of the outer panel can be further increased.

According to another embodiment of the present invention, the outside panel portion is formed to extend toward an outside in the vehicle width direction and be continuous to the vertical wall portions, inner-frame forming portion, and side edge frame portions of the inner panel. Thereby, the bending and torsional stresses inputted to the vertical wall portions, inner-frame forming portion, and lower end frame portion can be efficiently supported by the whole part of the inner panel, and the face rigidity of the outer panel can be further increased over a wide range in the vehicle width direction.

According to another embodiment of the present invention, a reinforcement portion which connects to the outer-frame forming portion and the inner-frame forming portion and has a U-shaped cross section is formed at the inside panel portion. Thereby, since the reinforced portion having the U-shaped cross section and connecting to the outer-frame forming portion and the inner-frame forming portion is formed at the inside panel portion, the bending and torsional stresses inputted to the outer-frame forming portion and the inner-frame forming portion can be efficiently supported and absorbed by the whole part of the inner panel.

According to another embodiment of the present invention, the reinforcement portion is comprised of plural portions which are provided over the lower end frame portion of the outer-frame forming portion and the inner-frame forming portion, and the plural portions cross each other. Thereby, a cross-shaped stress support portion as a reinforcement portion is formed between the inner-frame forming portion and the lower end frame portion, the bending and torsional stresses inputted to the inner-frame forming portion and lower end frame portion can be efficiently supported by the whole part of the inner panel, and the face rigidity of the outer panel can be further increased.

According to another embodiment of the present invention, the inner panel includes a pair of vertical wall portions which connects to the inner-frame forming portion at a midway position thereof in a vehicle width direction and partitions a space formed between the outer-frame forming portion and a mechanism portion installed to the lift gate into a left side and a right side, and the outside panel portion and the reinforcement portion are formed on an outside, in a vehicle width direction, of the pair of vertical wall portions. Thereby, since the inner-frame forming portion is reinforced by using the pair of vertical wall portions partitioning the space formed between the outer-frame forming portion and the mechanism portion installed to the lift gate into the left side and the right side, the bending and torsional stresses inputted to the inner-frame forming portion can be supported by the whole part of the inner panel via the pair of vertical wall portions, thereby increasing the rigidity of the lift gate further. Further, the outside panel portion and the reinforcement portion can be efficiently arranged at the face portion of the outer panel, thereby properly providing the lightweight structure.

According to another embodiment of the present invention, a lateral wall portion interconnecting upper end portions of the pair of vertical wall portions is formed, and a trim member covering over a specified portion on the vehicle-compartment side which is enclosed by the lateral wall portion, the pair of vertical wall portions, and the lower end frame portion of the outer-frame forming portion is provided. Thereby, the mechanism portion can be covered with a properly-small number of trim members, thereby improving the lightweight structure and the product values.

According to another embodiment of the present invention, the vertical wall portions and the lateral wall portion are formed to have a U-shaped cross section such that an opening thereof is directed toward the vehicle outside. Thereby, the rigidity of the vertical wall portions and the lateral wall portion can be increased without increasing the plate thickness, thereby increasing the rigidity of the lift gate further.

According to another embodiment of the present invention, an outer edge end portion of the outer panel adheres to at least an outer edge end portion of a lower portion of the outer-frame forming portion. Thereby, the bending rigidity of the lift gate can be properly increased.

According to another embodiment of the present invention, an upper end frame portion which integrally interconnects both-side upper end portions of the outer-frame forming portion and forms a closed cross section portion with the outer panel is provided. Thereby, forming of the inner panel can be facilitated, increasing the rigidity of the inner panel.

According to another embodiment of the present invention, openings are formed at an upper flange wall and a lower flange wall of said lower end frame portion to face to each other and a cylindrical inner handle member is provided to penetrate the openings. Thereby, the inner handle member can be fixed for positioning by using the U-shaped cross section of the lower end frame portion, so that the opening or closing operation of the lift gate can be ensured.

Other features, aspects, and advantages of the present invention will become apparent from the following description which refers to the accompanying drawings.

DETAILED DESCRIPTION OF THE INVENTION

Hereinafter, preferable embodiments of the present invention will be described. In the embodiments, when a lift gate is closed, a front side in a vehicle longitudinal direction is referred to as a front simply, and a left side in a vehicle lateral direction is referred to as a left simply.

Embodiment 1

Figure 1:
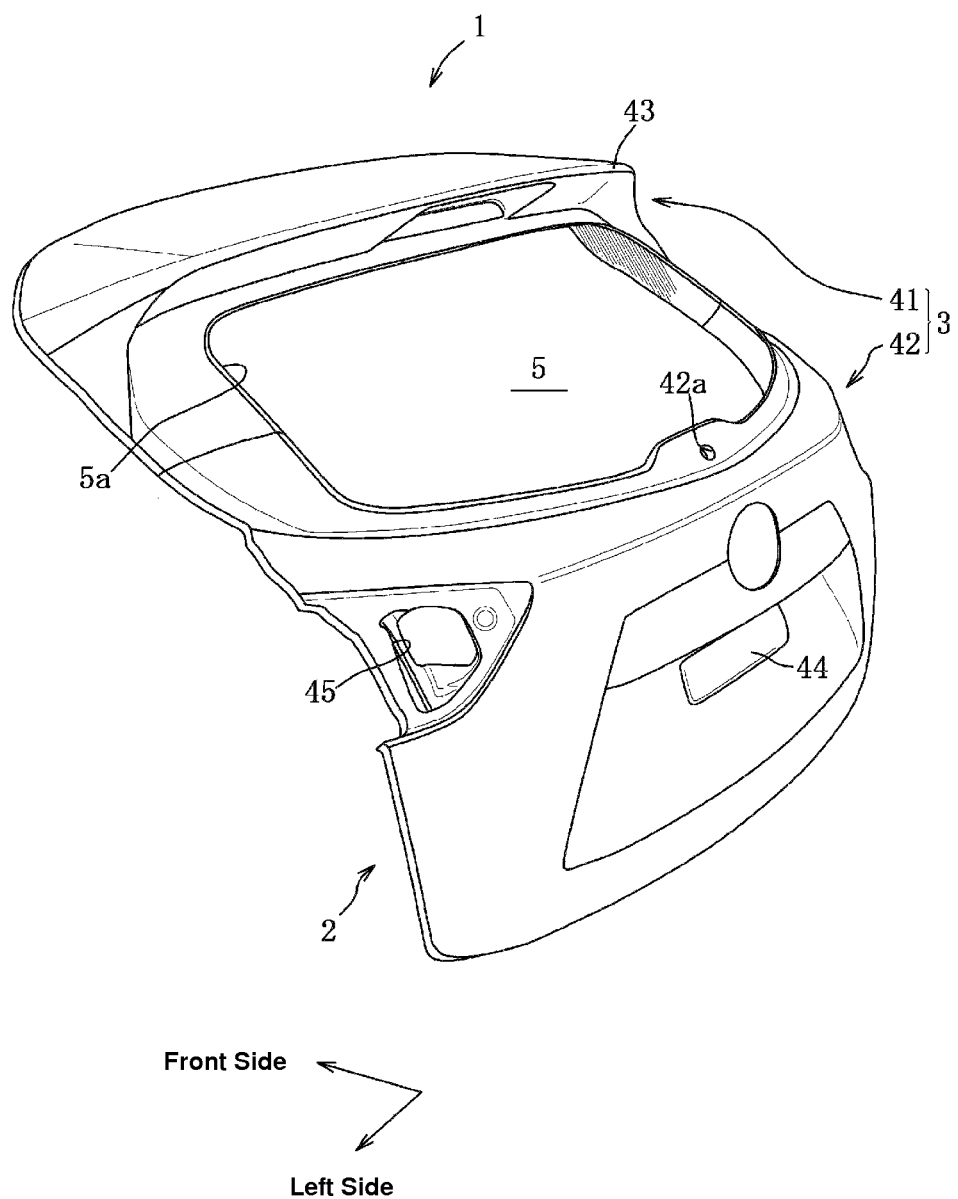
FIG. 1 is a perspective view of a lift gate according to a first embodiment of the present invention, when viewed from a vehicle rear.

A first embodiment of the present invention will be described referring to FIGS. 1-15. FIG. 1 shows a lift gate 1 of a hatch back type of passenger vehicle according to the present invention, and the lift gate 1 is provided to rotate around a hinge (not illustrated) fixed to a vehicle-body side so as to open or close an opening portion (not illustrated) formed at a rear portion of the vehicle.

Figure 2:
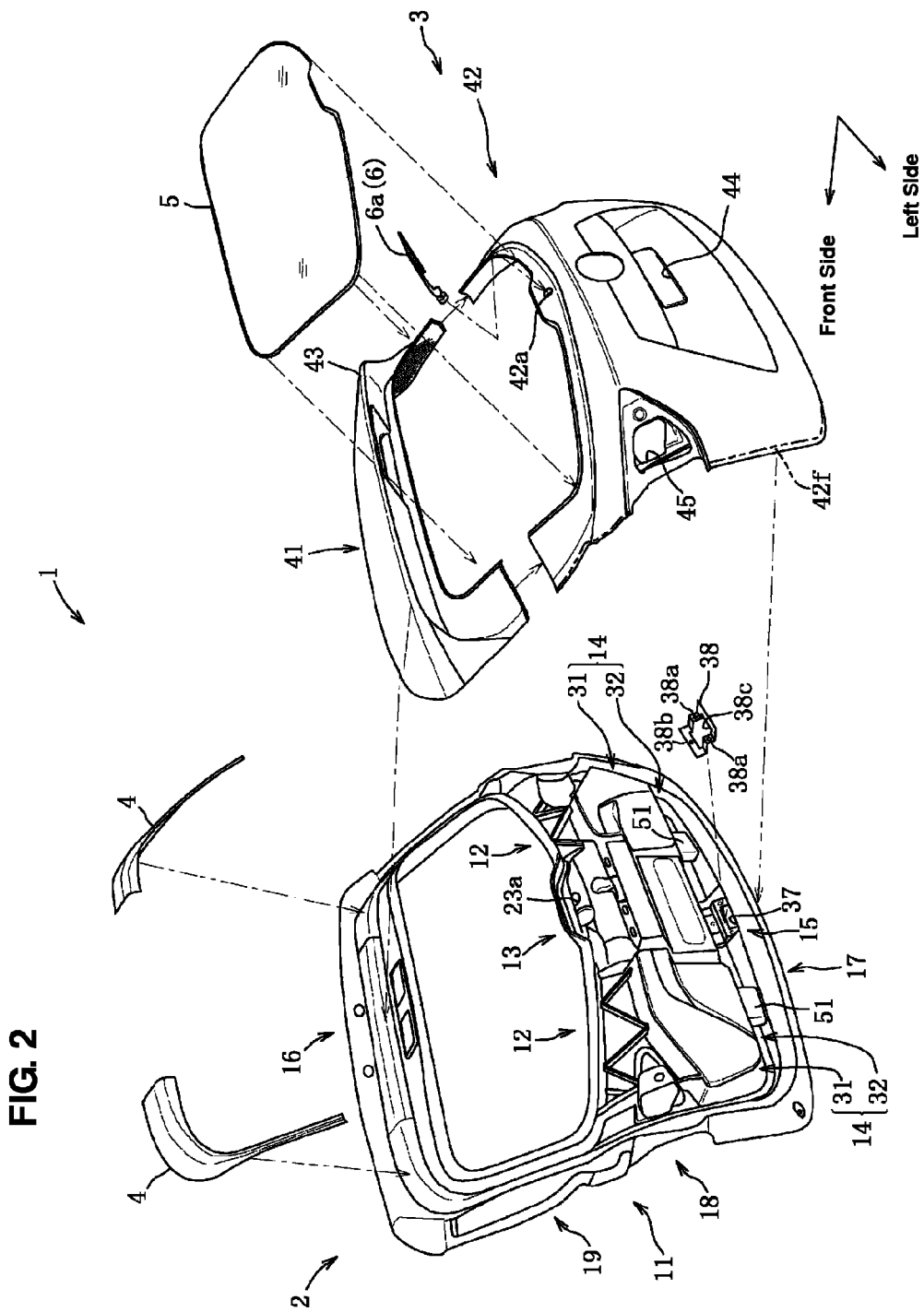
FIG. 2 is an exploded perspective view of the lift gate, when viewed from the vehicle rear.
Figure 3:
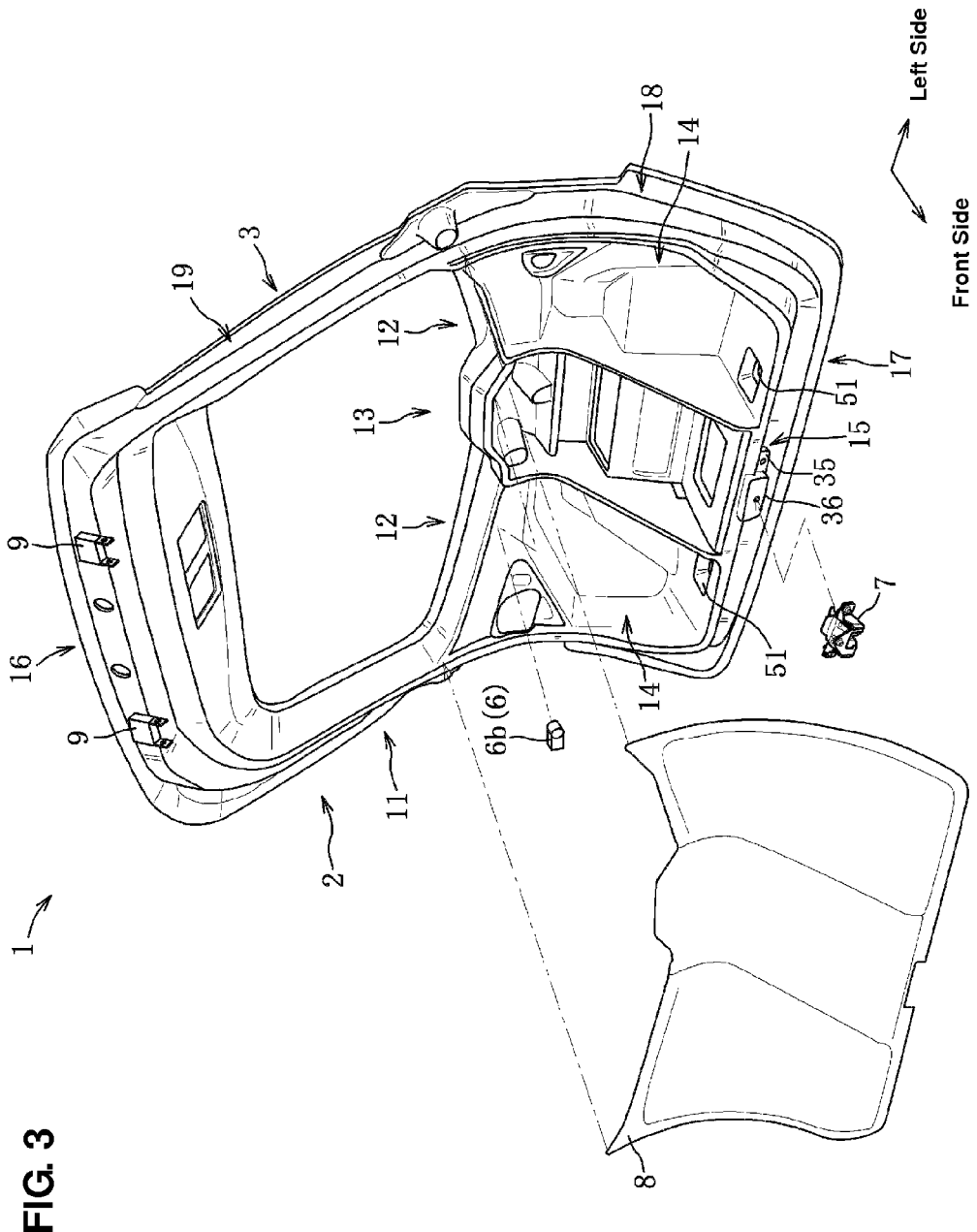
FIG. 3 is an exploded perspective view of the lift gate, when viewed from a vehicle front.

As shown in FIGS. 2 and 3, the lift gate 1 comprises an inner panel 2, an outer panel 3, a pair of right-and-left pillar reinforcements 4, a rear windowpane (window glass) 5 and others, and is formed in a substantially curved shape in a side view. The lift gate 1 is manufactured in such a manner that the inner panel 2 is formed, then the outer panel 3, the pillar reinforcements 4 and the rear window glass 5 are respectively attached to the inner panel 2, and finally a power unit mechanism 6, a latch mechanism 7, a trim member 8, an inner handle member 51 and others are installed. The inner panel 2 and the outer panel 3 are formed by means of an injection of molten synthetic resin into a metal mold so that a plate thickness thereof becomes about 2-2.5 mm. Polypropylene containing long glass fibers is used as a resin material for the inner panel 2, and the outer panel 3 is made from resin material of polypropylene. Herein, the resin material used for the panels should not be limited to the above-described material, but any other material, such as polycarbonate resin or ABS may be used.

As shown in FIGS. 2-13, the inner panel 2 comprises an outer-frame forming portion 11, a pair of right-and-left inner-frame forming portions 12, a mechanism storage portion 13, a right-and-left panel portions 14, a latch storage portion 15, an upper end frame portion 16 and others, which are integrally formed through an injection forming. The outer-frame forming portion 11 is formed to have a U-shaped cross section $U_{11}$ such that an opening thereof is directed toward the vehicle rear, and comprises plural flange walls and a bottom wall which connects respective end portions of the flange walls. The U-shaped cross section of the outer-frame forming portion 11 extends continuously around the inner panel 2.

Figure 9:
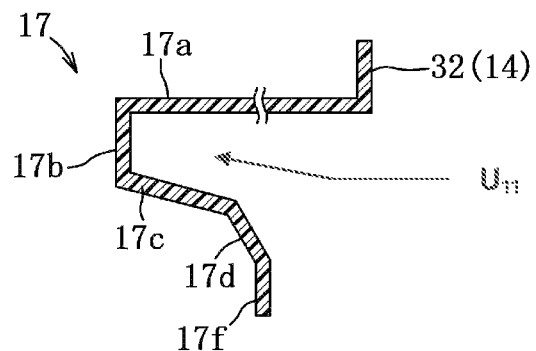
FIG. 9 is a sectional view taken along line IX-IX of FIG. 8.

The outer-frame forming portion 11 comprises a lower end frame portion 17, a right-and-left side edge frame portions 18, and others. The lower end frame portion 17 forms a lower end portion of the inner panel 2. As shown in FIG. 9, the lower end frame portion 17 comprises an upper side frame wall 17a, a lower flange wall 17c, a bottom wall 17b which connects front end portions of the flange walls 17a, 17c, an outside flange wall 17d which projects toward the vehicle rear from an rear end portion of the lower flange wall 17c, and an outer edge end portion 17f which projects downwardly and toward the vehicle rear from an rear end portion of the outside flange wall 17d. Accordingly, the lower end frame portion 17 has a U-shaped cross section $U_{11}$ such that an opening thereof is directed toward the vehicle rear, and comprises the upper side frame wall 17a, the bottom wall 17b, and the lower flange wall 17c.

As shown in FIGS. 4, 5, 7, 8 and 13, a pair of cylindrical inner handle members 51 is provided at both-side portions of the lower end frame portion 17. Handle openings 52, 53 are formed at the upper flange wall 17a and the lower flange wall 17c to face to each other in a vertical direction. The inner handle member 51 is provided to penetrate these handle openings 52, 53. Thereby, the inner handle member 51 can be fixed for positioning by using the U-shaped cross section of the lower end frame portion 17, so that the opening or closing operation of the lift gate 1 can be ensured.

Figure 10:
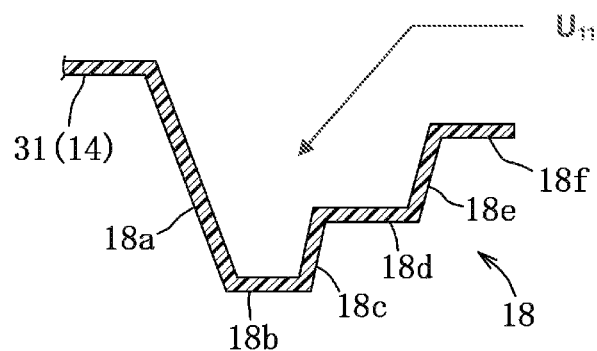
FIG. 10 is a sectional view taken along line X-X of FIG. 8.
Figure 11:
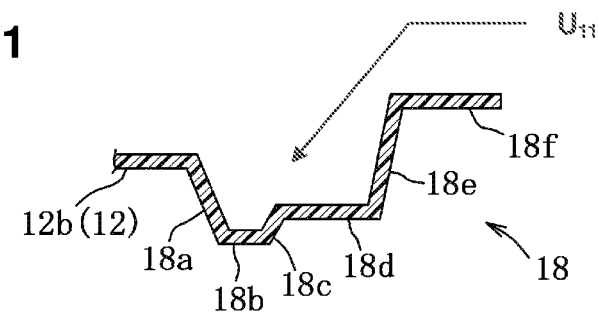
FIG. 11 is a sectional view taken along line XI-XI of FIG. 8.

The right-and-left side edge frame portions 18 extend upwardly, respectively, from right and left ends of the lower end frame portion 17, which form right and left end portions of the inner panel 2. As shown in FIGS. 10 and 11, the left side edge frame portion 18 comprises an inside flange wall 18a which connects to a left end portion (an outside end portion in the vehicle width direction) of the upper flange wall 17a and extends upwardly, a first bottom wall 18b which connects to a left end portion of the bottom wall 17b and bends outwardly from a front end portion of the inside flange wall 18a, a central flange wall 18c which connects to a left end portion of the lower flange wall 17c and extends toward the vehicle rear from a left end portion of the first bottom wall 18b, a second wall 18d which connects to a left end portion of the outside flange wall 17d and bends outwardly from a rear end portion of the central flange wall 18c, an outside flange wall 18e which extends toward the vehicle rear from a left end portion of the second bottom wall 18d, and an outer edge end portion 18f which connects to a left end portion of the outer edge end portion 17f and projects outwardly from a rear end portion of the outside flange wall 18e. The right side edge frame portion 18 is formed symmetrically relative to the left side edge frame portion 18.

The right-and-left side edge frame portions 18 have, respectively, a U-shaped cross section $U_{11}$ such that an opening thereof is directed toward the vehicle rear, which comprises the inside flange wall 18a, the first bottom wall 18b and the central flange wall 18c. The inside flange wall 18a, the first bottom wall 18b, the central flange wall 18c, the second bottom wall 18d, and the outside flange wall 18e form a structure having a hook-shaped cross section. The inside flange wall 18a is configured to be positioned on the front side at its middle-stage position, and the first bottom wall 18b is configured such that the longitudinal distance between its upper-side portion and the second bottom wall 18d is smaller than that between its lower-side portion and the second bottom wall 18d. Therefore, the U-shaped cross-section structure formed by the inside flange wall 18a, the first bottom wall 18b and the central flange wall 18c is configured such that the mount of projection toward the vehicle front of its upper-side portion is smaller than that of its lower-side portion.

Figure 12:
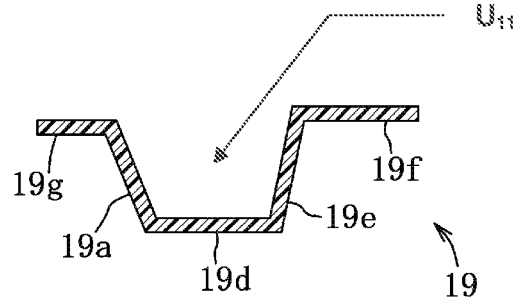
FIG. 12 is a sectional view taken along line XII-XII of FIG. 8.
Figure 13:
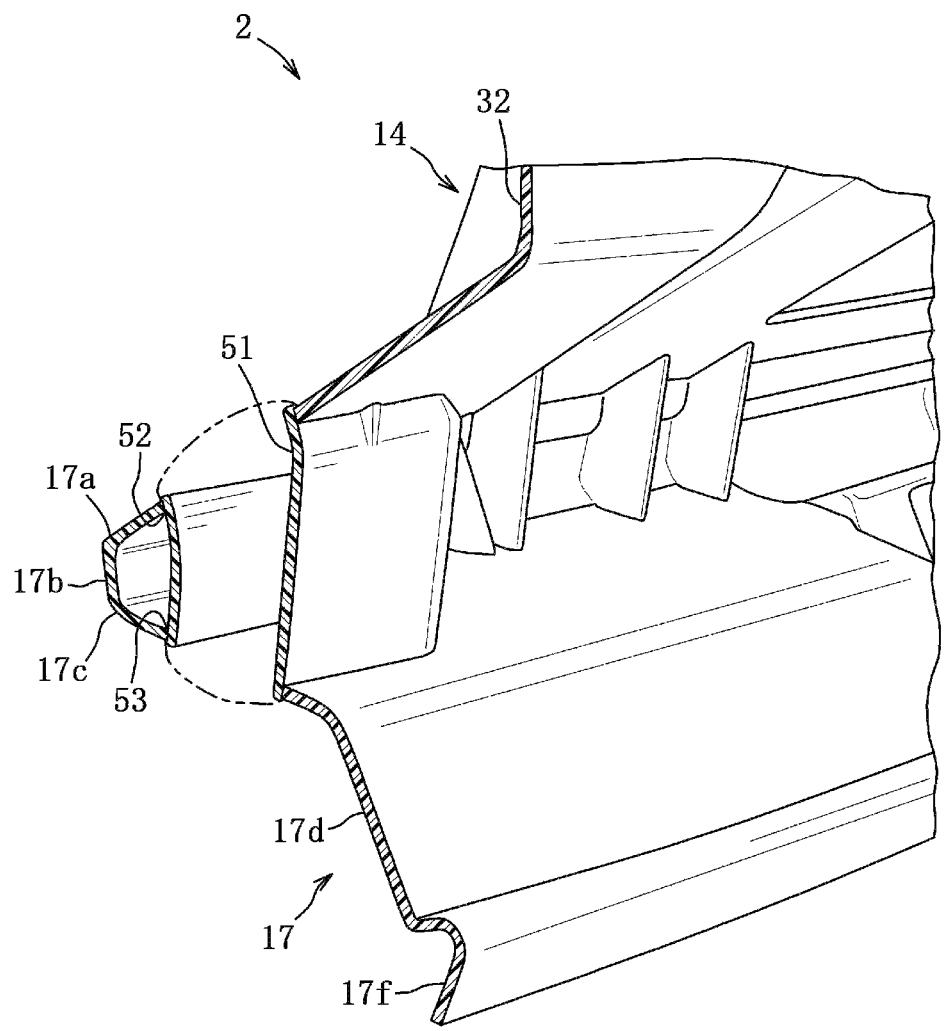
FIG. 13 is a vertical sectional view of a major part of an inner handle portion.
Figure 14:
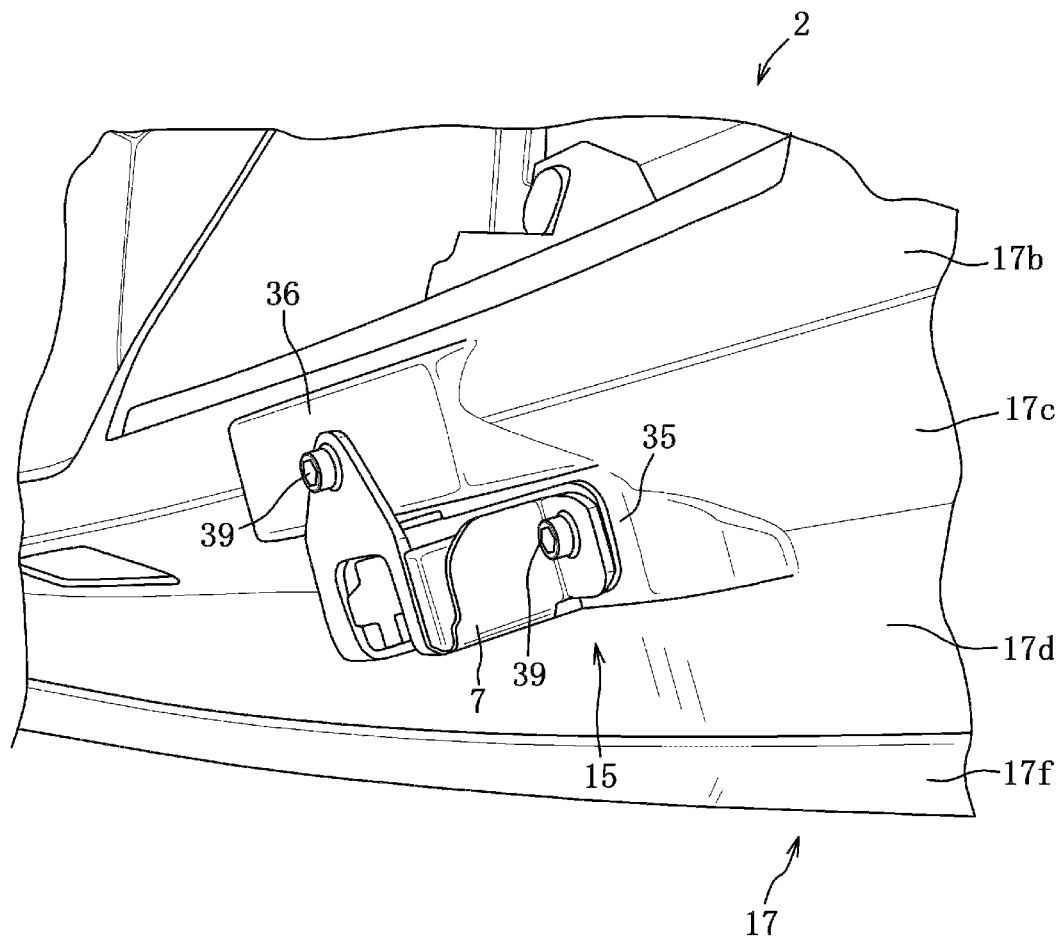
FIG. 14 is a perspective view of a major part of a latch mechanism and its attaching seat portion.

The pair of side edge frame portions 18 includes a pair of right-and-left pillar portions 19, respectively, which is formed in a forwardly-and-upwardly slant shape above the inner-frame forming portion 12. As shown in FIG. 12, the left pillar portion 19 comprises an inside flange wall 19a which connects to an upper end portion of the inside flange wall 18a and extends upwardly, a bottom wall 19d which connects to upper end portions of the first bottom wall 18b and the second bottom wall 18d and bends outwardly from a front end portion of the inside flange wall 19a, an outside flange wall 19e which connects to an upper end portion of the outside flange wall 18e and extends toward the vehicle rear from a left end portion of the bottom wall 19d, an outer edge end portion 19f which connects to an upper end portion of the outer edge end portion 18f and projects outwardly in the vehicle width direction from a rear end portion of the outside flange wall 19e, and an inner edge end portion 19g which projects inwardly in the vehicle width direction from a rear end portion of the inside flange wall 19a. The right pillar portion 19 is formed symmetrically relative to the left pillar portion 19. Thus, the pair of left-and-right pillar portions 19 has a U-shaped cross section $U_{11}$ such that an opening thereof is directed toward the vehicle rear, which comprises the inside flange wall 19a, the bottom walls 19, and the outside flange wall 19e, respectively.

Accordingly, the respective bottom walls 17b, 18b, 19d are arranged forwardly and the respective flange walls 17a, 17c, 18a, 18c, 19a, 19e open toward the vehicle rear, so that the structure having the U-shaped cross section $U_{11}$ is formed around the outer edge of the inner panel 2 in a U shape around. Thereby, the rigidity of the inner panel 2, especially the rigidity of that against a stress acting in the vehicle longitudinal direction, can be increased.

As shown in FIGS. 2 through 8, a pair of right-and-left inner-frame forming portions 12 is provided at a middle position, in the vertical direction, of the inner panel 2 and at a lower edge portion of a window opening portion 5a where the window glass (windowpane) is attached. The left inner-frame forming portion 12, which is formed to have a U-shaped cross section $U_{12}$ such that an opening thereof is directed toward the vehicle rear, comprises a pair of upper-and-lower flange walls 12a, 12c, a bottom wall 12b which interconnects front end portions of the flange walls 12a, 12c and connects to the inside flange wall 18a, an inner edge end portion 12g which projects upwardly from a rear end portion of the upper flange wall 12a, plural inner-frame rib portions 26, and others. The upper flange wall 12a of the left inner-frame forming portion 12 connects to the inside flange wall 19a of the left pillar portion 19, and the inner edge end portion 12g connects to the inner edge end portion 19g.

Figure 7:
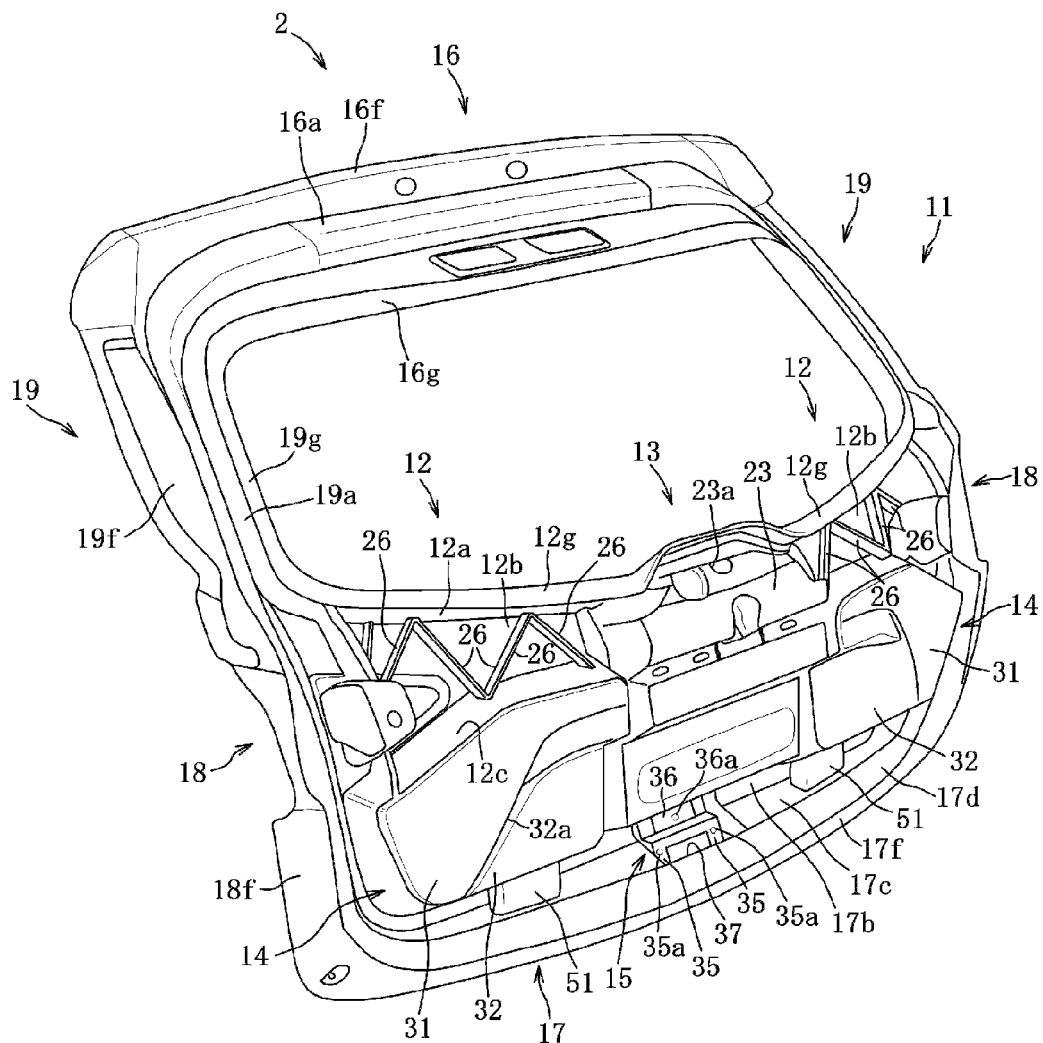
FIG. 7 is a perspective view of an inner panel, which viewed from the vehicle rear.
Figure 8:
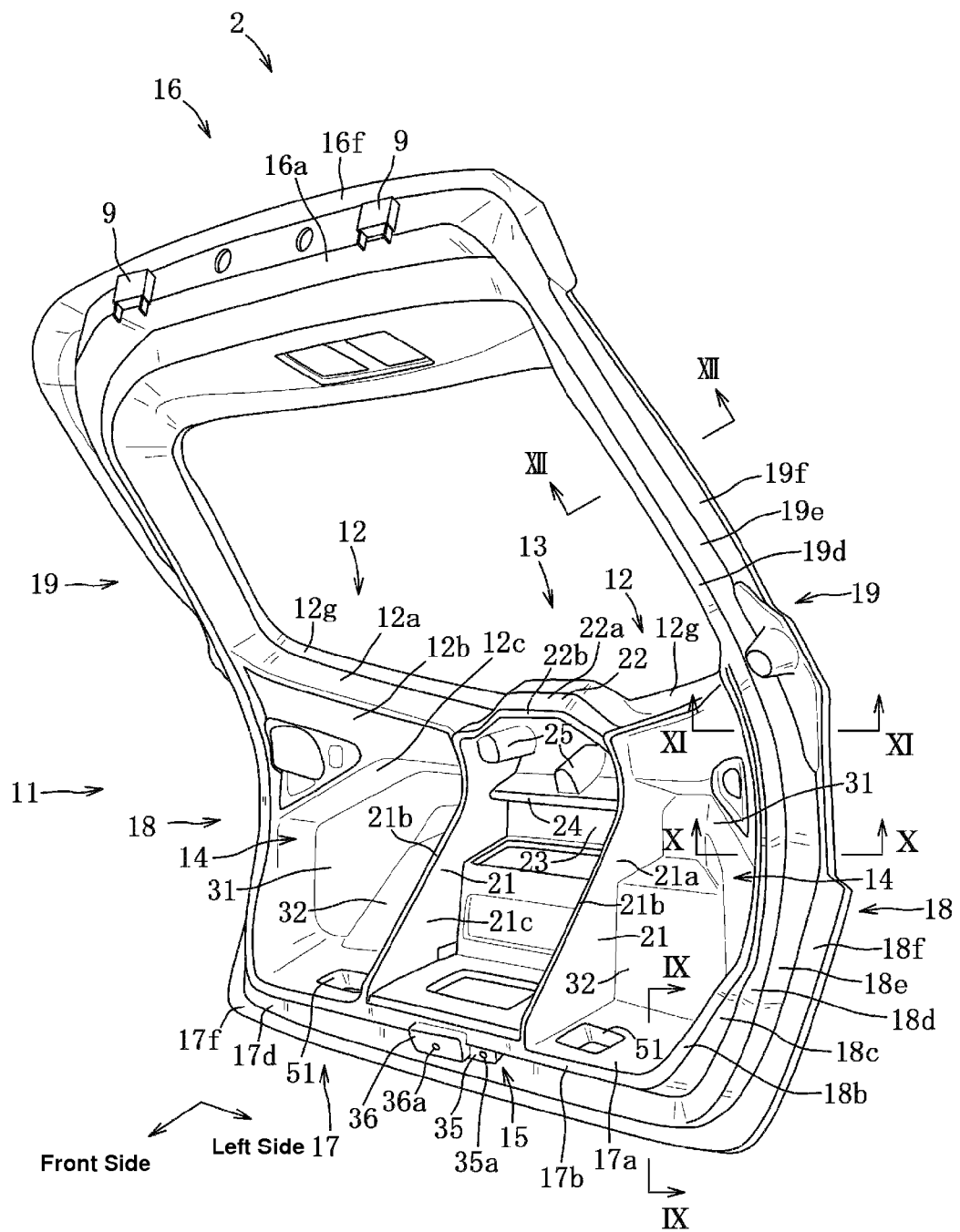
FIG. 8 is a perspective view of an inner panel, which viewed from the vehicle front.

As shown in FIG. 7, the four inner-frame rib portions 26 are provided at the left inner-frame forming portions 12, which are formed to extend toward the vehicle rear from a rear portion of the bottom wall 12b over a space formed between a pair of upper-and-lower flange walls 12a, 12c. The inner-frame rib portion 26 located at the inside end in the vehicle width direction extends obliquely upwardly and outwardly in the vehicle width direction from an upper portion of the lower flange wall 12c and its upper end portion connects to a lower portion of the upper flange wall 12a. The inner-frame rib portion 26 adjacent to the above-described one located at the inside end connects to an upper end portion of the one located at the inside end, extends obliquely downwardly and outwardly from the lower portion of the upper flange wall 12a, and its lower end portion connects to the upper portion of the lower flange wall 12c. Thus, the inner-frame rib portions 26 are provided to interconnect the flange walls 12a, 12c in a zigzag shape. The right inner-frame forming portion 12 is formed symmetrically relative to the left inner-frame forming portion 12. The U-shaped cross section of the pair of right-and-left inner-frame forming portions 12 is configured to be continuous to the U-shaped cross section of the outer-frame forming portion 11.

As shown in FIGS. 2-4, 6-8, the mechanism storage portion 13 is formed such that a lower and central portion, in the vehicle width direction, of the inner panel 2 is concaved rearward, where various mechanism portions, such as a drive portion 6b of the power unit mechanism 6, the latch mechanism 7, and a lamp mechanism (not illustrated), are stored from the vehicle front. The mechanism storage portion 13 comprises a pair of right-and-left vertical wall portions 21 which projects forwardly from a front portion of the inner panel 2, a lateral wall portion 22 which projects forwardly from a front portion of the inner panel 2, a panel portion 23, a rib portion 24 which projects forwardly from the panel portion 23, plural projection portions 25 which project forwardly from the panel portion 23, and others.

Figure 6:
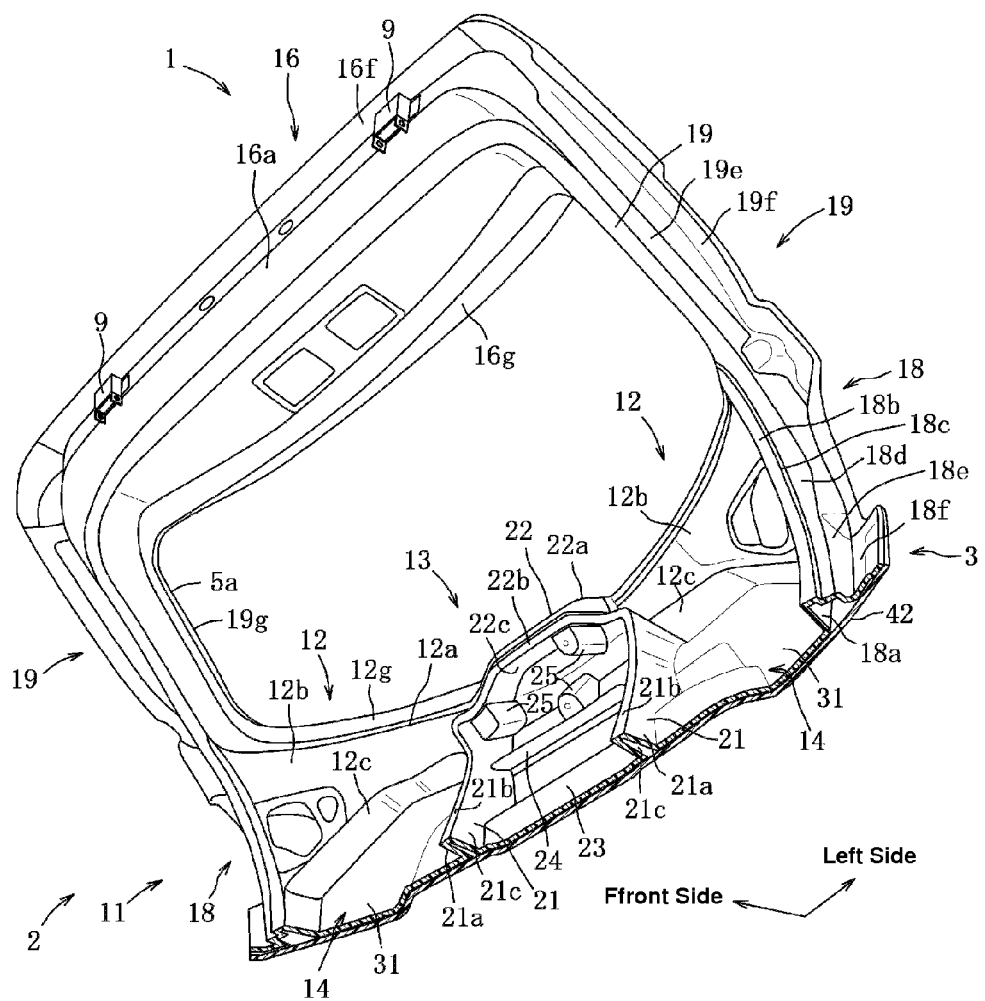
FIG. 6 is a lateral sectional perspective view of the lift gate.

The pair of vertical wall portions 21 connects to respective inward end portions of the pair of inner-frame forming portions 12 at a midway position of the inner panel 2. Each of the respective vertical portions 21 is formed to partition a space formed between the side edge frame portion 18 and the wiper unit mechanism 6 into a left side and a right side, and extends from the lower edge portion of the window opening portion 5a formed above the inner-frame forming portion 12 to the upper flange wall 17a of the lower end frame portion 17. As shown in FIG. 6, each of the vertical wall portions 21 is formed to have a U-shaped cross section such that an opening thereof is directed toward the vehicle rear, and comprises an outside flange wall 21a provided on the vehicle outside, an inside flange wall 21c provided adjacently to outside flange wall 21a in the vehicle width direction, and a bottom wall 21b provided to interconnect respective front end portions of the flange walls 21a, 21c. The inside end portions, in the vehicle width direction, of the pair of inner-frame forming portions 12 are connected to the both of the outside flange walls 21a. Thereby, the lower side portion of the inner panel 2 is formed in a grid shape, so that the bending or torsional stresses inputted to the inner-frame forming portion 12 and the lower end frame portion 17 can be dispersed to the whole part of the inner panel 2 via the pair of right-and-left vertical wall portions 21, thereby supported efficiently at the whole part of the inner panel.

Figure 4:
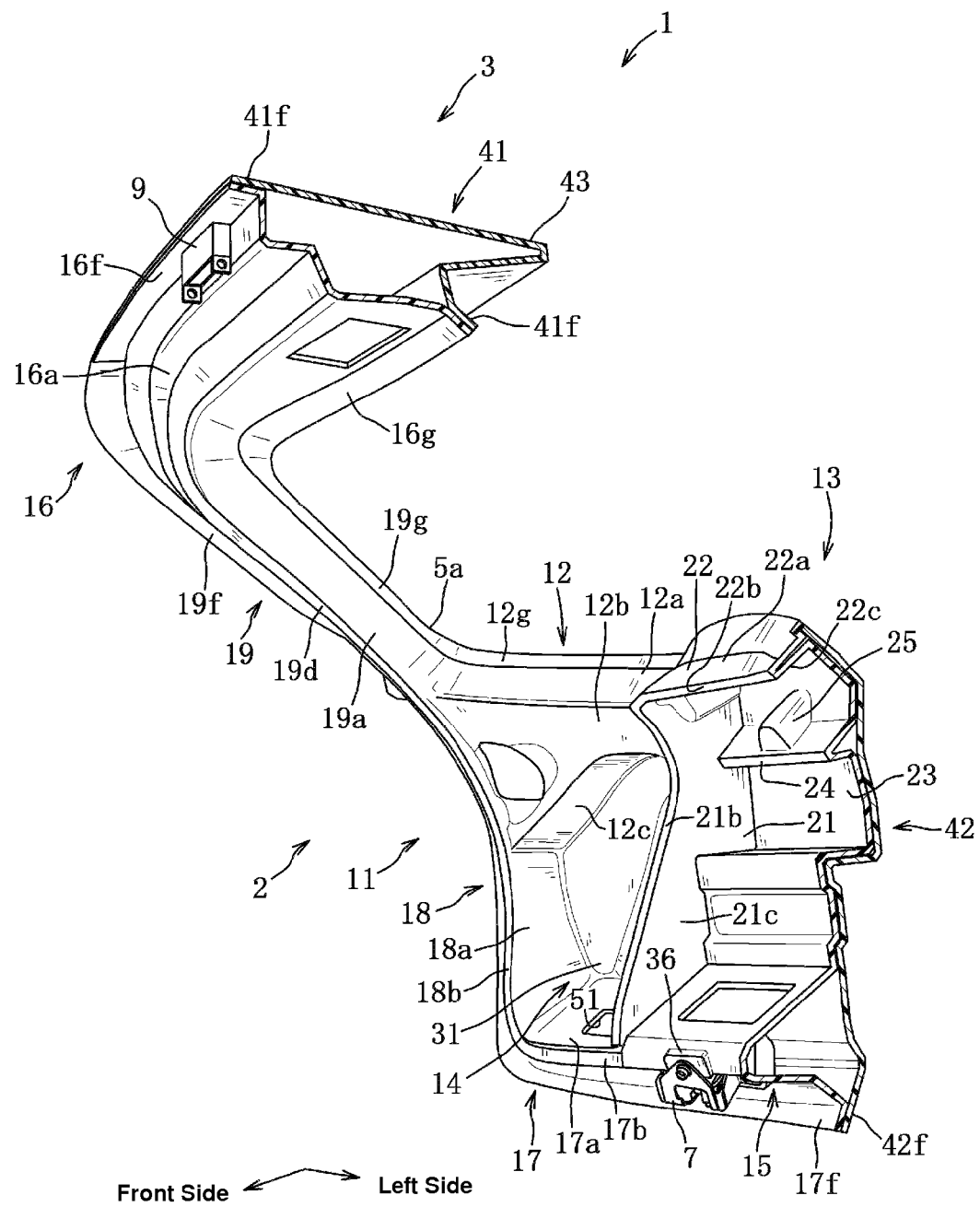
FIG. 4 is a vertical sectional perspective view of the lift gate, when viewed from the vehicle front.

The lateral wall portion 22 is formed at the lower edge portion of the window opening portion 5a to interconnect respective upper end portions of the pair of vertical wall portions 21. As shown in FIG. 4, the lateral wall portion 22 is formed to have a U-shaped cross section such that an opening thereof is directed toward the vehicle rear, and comprises an upper flange wall 22a which extends between the both outside flange walls 21a and curves projecting upwardly, a lower flange wall 22c which extends between the both inside flange walls 21c and curves projecting upwardly, and a bottom wall 22b which interconnects respective front end portions of the upper and lower flange walls 22a, 22c and connects to the bottom wall 21b. Thereby, the pair of right-and-left side edge frame portions 18 is interconnected by the pair of inner-frame forming portions 12 having the U-shaped cross section and the lateral wall portion 22 having the U-shaped cross section, so that the inner panel 2 is formed in a grid shape to partition itself into a upper side and a lower side.

The panel portion 23 of the mechanism storage portion 13 is formed to cover over a space enclosed by the lower end frame portion 17, the pair of vertical wall portions 21, and the lateral wall portion 22 in a flat face shape. The panel portion 23 is configured to respectively connect perpendicularly to the upper flange wall 17a, respective rear ends of the both inside flange walls 21c, and a rear end of the lower flange wall 22c. The panel portion 23 has an opening 23a for connection of a wiper portion 6a to a drive portion 6b of the wiper unit mechanism 6, the reinforcing rib portion 24, and the plural projection portions 25, and others.

The opening 23a is formed at a specified position of the panel portion 23 which is located at the center in the vehicle width direction and near the lower edge of the window opening portion 5a, through which a drive shaft of the wiper portion 6a passes. The rib portion 24 is formed to protrude forwardly from the front portion of the panel portion 23 and extend in the vehicle width direction between the both inside flange walls 21c. The projection portions 25 are formed in a pole shape to project forwardly from the front portion of the panel portion 23. The inner panel 2 can be moved easily by grabbing the projection portions 25, without any other portions of that being touched, during carrying of the inner panel 2. When some works of processing or assembling are conducted to the inner panel 2, the positioning of the inner panel 2 can be properly executed by fixing the projection portions 25 with positioning jigs.

When the lift gate 1 is assembled, the drive portion 6b of the wiper unit mechanism 6, the latch mechanism 7, the lamp mechanism and the like are installed inside the mechanism storage portion 13, and a front side (vehicle-compartment side) of the mechanism storage portion 13 enclosed by the lower end frame portion 17, the pair of vertical wall portions 21, and the lateral wall portion 22 is covered with the trim member 8. As shown in FIG. 3, the trim member 8 is attached to the respective bottom walls 12b, 17b, 18b from the front side by clips (not illustrated).

As shown in FIGS. 2-8, the pair of right-and-left panel portions 14 is arranged at both sides of the mechanism storage portion 13, and formed to cover a portion enclosed by the outer-frame forming portion 11, the inner-frame forming portion 12, and the mechanism storage portion 13. An outside panel portion 31 and an inside panel portion 32 which connects to the outside panel portion 31 and projects toward the vehicle front (vehicle-compartment side) beyond the outside panel portion 31 are formed integrally with each of the pair of right-and-left panel portions 14.

The outside panel portion 31 is formed to extend from the outside flange wall 21a to the inside flange wall 18a such that its outside portion lowers further and its width in the vertical direction becomes greater. The outside panel portion 31 is configured such that an inside end thereof connects to a rear end portion of the outside flange wall 21a, an outside end thereof connects to a rear end portion of the inside flange wall 18a, an upper end thereof connects to a rear end portion of the lower flange wall 12c, and a lower end thereof connects to a rear end portion of the outside flange wall 17a. The outside panel portion 31 is configured to project toward the vehicle rear, and its rear portion contacts the front portion of the outer panel 3. Thus, since the outside panel portion 31 contacts the outer panel 3 tightly when the outer panel 3 is assembled to the inner panel 2, the face rigidity of the outer panel 3 can be increased by utilizing the face rigidity of the inner panel 2, so that the surface vibrations or dent can be properly restrained from generating at the face portion of the outer panel 3.

Figure 5:
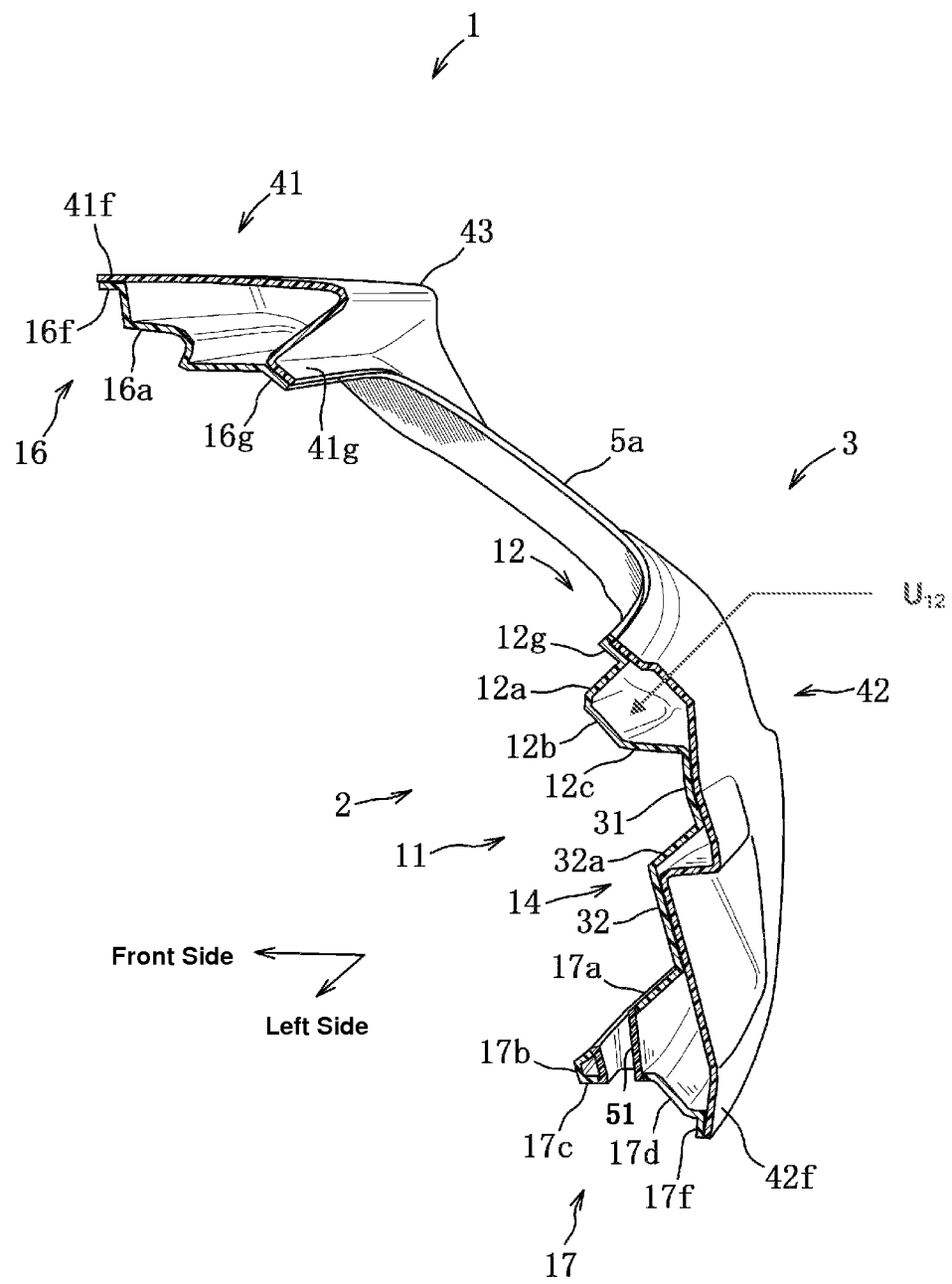
FIG. 5 is a vertical sectional perspective view of the lift gate, when viewed from the vehicle rear.

As shown in FIG. 5, the inside panel portion 32 is provided below the outside panel portion 31 at the inside position in the vehicle width direction, and connects to a lower portion of the outside panel portion 31 via a slant portion 32a which extends obliquely downwardly and forwardly. The inside panel portion 32 is configured such that its inside end in the vehicle width direction connects to a rear end portion of the outside flange wall 21a, its outside end in the vehicle width direction and its upper end connect to the lower portion of the outside panel portion 31 via the slant portion 32a, and its lower end connects to a rear end portion of the outside flange wall 17a.

As shown in FIGS. 2-4, 7, 8, 14 and 15, the latch storage portion 15 is formed at a specified position which is located below the mechanism storage portion 13 and at the central position in the vehicle width direction by protruding the lower flange wall 17c of the lower end frame portion 17 forwardly (toward the vehicle-compartment side), where the latch mechanism 7 and an actuator 7a to operate the latch mechanism 7 are stored.

The latch storage portion 15 includes a pair of right-and-left first attaching seat portions 35, a second attaching seat portion 36, an opening portion for latch 37, and a latch-mechanism attaching bracket 38. The pair of right-and-left first attaching seat portions 35 is formed by protruding the lower flange wall 17c toward the vehicle front in a rectangular parallelepiped shape. The pair of right-and-left first attaching seat portions 35 is provided with a specified distance therebetween in the vehicle width direction, and has a pair of bolt holes 35a for attaching the latch mechanism 7 at a front portion thereof.

The second attaching seat portion 36 is formed at a specified position which is located between and above the pair of right-and-left first attaching seat portions 35 by protruding the bottom wall 17b and the lower flange wall 17c toward the vehicle front in a rectangular parallelepiped shape. A front portion of the second attaching seat portion 36 protrudes forwardly beyond a front portion of the first attaching seat portions 35, and is formed in a stepwise shape in the side view. A bolt hole 36a for attaching the latch mechanism 7 is formed at the front portion of the second attaching seat portion 36. Thereby, plural edge portions are formed at the latch storage portion 15, so that the strength of attaching the latch can be increased.

Figure 15:
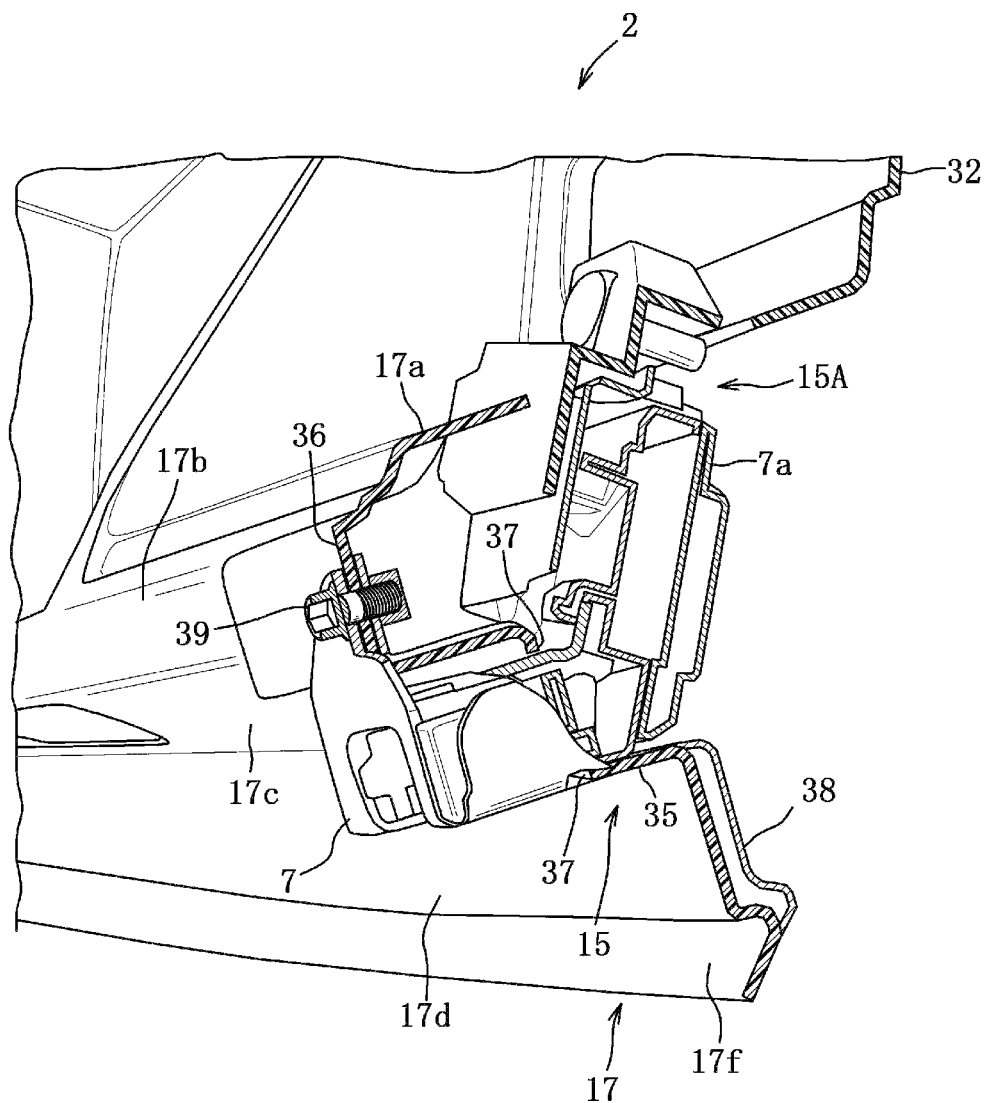
FIG. 15 is a partial vertical sectional view of FIG. 14.

The opening portion for latch 37 is formed in a substantially rectangular shape at a specified position which is located between the pair of right-and-left first attaching seat portions 35 and below the second attaching seat portion 36, into which the latch mechanism 7 can be inserted from the vehicle front when the latch mechanism 7 is attached. The latch-mechanism attaching bracket 38 is provided in back of the first attaching seat portions 35 and the second attaching seat portion 36. As shown in FIGS. 2 and 15, the latch-mechanism attaching bracket 38 is formed by bending a metal plate in a V shape. The latch-mechanism attaching bracket 38 has a pair of first bolt holes 38a, a second bolt hole 38b, and an opening portion for latch 38c. The latch-mechanism attaching bracket 38 is configured to be assembled to the pair of right-and-left first attaching seat portions 35 and the second attaching seat portion 36 from the rear side. When the latch-mechanism attaching bracket 38 is assembled to the first attaching seat portions 35 and the second attaching seat portion 36, the pair of first bolt holes 38a, the second bolt hole 38b, and the opening portion for latch 38c are provided so as to correspond to the pair of bolt holes 35a, the bolt hole 36a, and the opening portion for latch 37, respectively.

The latch mechanism 7 is fixed to the pair of first attaching seat portions 35 and the second attaching seat portion 36 which are reinforced by the latch-mechanism attaching bracket 38 by the three bolts 39. Accordingly, when the latch mechanism 7 engages with a vehicle-body side striker (not illustrated) through the closing operation of the lift gate 1, the load inputted to the respective attaching seat portions 35, 36 via the latch mechanism 7 can be supported at the latch-mechanism attaching bracket 38, so that the input load can be efficiently dispersed to the outer-frame forming portion 11 via the latch-mechanism attaching bracket 38. Further, since the respective attaching seat portions 35, 36 are formed in the continuous stepwise shape in the side view, the latch attaching strength can be improved and also the rigidity of the lower end frame portion 17 of the outer-frame forming portion 11 can be increased.

As shown in FIGS. 2-8, the upper end frame portion 16 is integrally formed at the outer-frame forming portion 11 by interconnecting the upper end portions of the pair of right-and-left pillar portions 19. The upper end frame portion 16 comprises a body portion 16a, a pair of right-and-left hinge attaching portions 9 which is provided at both end portions of the body portion 16a, an outer edge end portion 16f formed at an upper portion, and an inner edge end portion 16g formed at a lower portion. Accordingly, the window opening portion 5a is formed by the lateral wall portion 22 and the inner edge frame portions 12g, 16g, 19g.

As shown in FIGS. 1, 2, 4 and 5, the outer panel 3 is comprised of two split members of an upper outer panel portion 41 and a lower outer panel portion 42. As shown in FIGS. 4 and 5, the upper outer panel portion 41 comprises an outer edge end portion 41f provided at upper and lower portions thereof and a spoiler portion 43 which projects rearward, which are integrally made by the injection forming. The upper outer panel portion 41 is assembled to the inner panel 2 from the vehicle rear by adhering the outer edge end portion 41f to the outer edge end portion 16f and thereby forms a closed cross section portion extending in the vehicle width direction with the upper end frame portion 16.

The lower outer panel portion 42 includes an opening 42a for connecting the wiper portion 6a and the drive portion 6b of the wiper unit mechanism 6, an outer edge end portion 42f formed at its right-and-left end portions and its lower end portion, a license-plate attachment portion 44 formed at a central position of its rear portion, and a pair of openings for right-and-left rear lights 45. The lower outer panel portion 42 is assembled to the inner panel 2 from the vehicle rear by adhering the outer edge end portion 42f to the outer edge end portion 17f of the lower end frame portion 17 and the outer edge end portion 18f of the side edge frame portion 18. When the lower outer panel portion 42 is assembled, a front portion of the lower outer panel portion 42 having a face contact with a rear portion of the outside panel portion 31.

Hereinafter, the operations and effects of the structure of the lift gate for a vehicle according to the first embodiment will be described. According to the present structure of the lift gate for a vehicle, since the inner panel 2 comprises the pair of side edge frame portions 18 including the pair of right-and-left pillar portions 19 and the lower end frame portion 17 formed integrally with the side edge frame portions 18 and there is also provided the outer-frame forming portion 11 having the U-shaped cross section $U_{11}$ such that its opening is directed toward the vehicle outside, the continuous U-shaped cross section extending from the upper end portion of one of the pillar portions 19 to the upper end portion of the other of the pillar portions 19 by way of the lower end frame portion 17 can be formed, so that the bending stress acting on the lift gate 1 can be firmly supported and thereby the bending rigidity of the lift gate 1 can be increased. Further, since the inner-frame forming portion 12 connects to the outer-frame forming portion 11 and has the U-shaped cross section $U_{12}$ with its opening being directed toward the vehicle outside, the inner panel 2 can be formed in the grid shape, thereby increasing the torsional rigidity of the respective side edge frame portions 18.

Also, since the outside panel portion 31 and the inside panel portion 32 continuous from the outside panel portion 31 are formed at the panel portion 14 of the inner panel 2, the bending and torsional stresses inputted to the outer-frame forming portion 11 and the inner-frame forming portion 12 can be supported and absorbed by the whole part of the inner panel 2. Moreover, since the outside panel portion 31 contacts the outer panel 3, the face rigidity of the outer panel 3 can be increased by utilizing the inner panel 2 and thereby the surface vibrations or dent can be restraining from generating.

Accordingly, the structure of the inner panel 2 can be improved without increasing the plate thickness, reinforcements, and the like, so that the weight of the synthetic-resin made lift gate 1 can be made properly lightweight as well as both the rigidity and the product values of the lift gate 1 can be improved.

Since the inner panel 2 includes the pair of vertical wall portions 21 which connects to the inner-frame forming portion 12 at the midway position thereof in the vehicle width direction and partitions the space formed between the outer-frame forming portion 11 and the wiper unit mechanism 6 into the left side and the right side, the pair of vertical wall portions 21 is formed to have the U-shaped cross section such that its opening is directed toward the vehicle outside, and the outside panel portion 31 is formed to be continuous to at least two adjacent portions among the vertical wall portions 21, inner-frame forming portion 12, side edge frame portions 18, and lower end frame portion 17 of the inner panel, the rigidity of the inner panel 2 and the face rigidity of the outer panel 3 can be further increased.

Since the outside panel portion 31 is formed to extend toward the outside in the vehicle width direction and be continuous to the vertical wall portions 21, inner-frame forming portion 12, and side edge frame portions 18, the bending and torsional stresses inputted to the vertical wall portions 21, inner-frame forming portion 12, and lower end frame portion 17 can be efficiently supported by the whole part of the inner panel 2, and the face rigidity of the outer panel 3 can be further increased over a wide range in the vehicle width direction.

Since the outer edge end portion 42*f* of the lower outer panel portion 42 adheres to the outer edge end portion 17*f* of the lower end frame portion 17, the bending rigidity of the lift gate 1 can be properly increased.

Since the upper end frame portion 16 which integrally interconnects the both-side upper end portions of the outer-frame forming portion 11 and forms the closed cross section portion with the outer panel 3 is provided, forming of the inner panel 2 can be facilitated, increasing the rigidity of the inner panel 2.

Since the openings 52, 53 are formed at the upper flange wall 17*a* and the lower flange wall 17*c* of the lower end frame portion 17 to face to each other and the cylindrical inner handle member 51 is provided to penetrate these handle openings 52, 53, the inner handle member 51 can be fixed for positioning by using the U-shaped cross section of the lower end frame portion 17, so that the opening or closing operation of the lift gate 1 can be ensured.

Embodiment 2

Next, a lift gate 1A according to the second embodiment will be described referring to FIGS. 16-28. Hereinafter, only structures different from the lift gate 1 according to the first embodiment will be described, and the same components as those of the first embodiment will be denoted by the same reference characters, detailed descriptions of which are omitted here.

Figure 16:
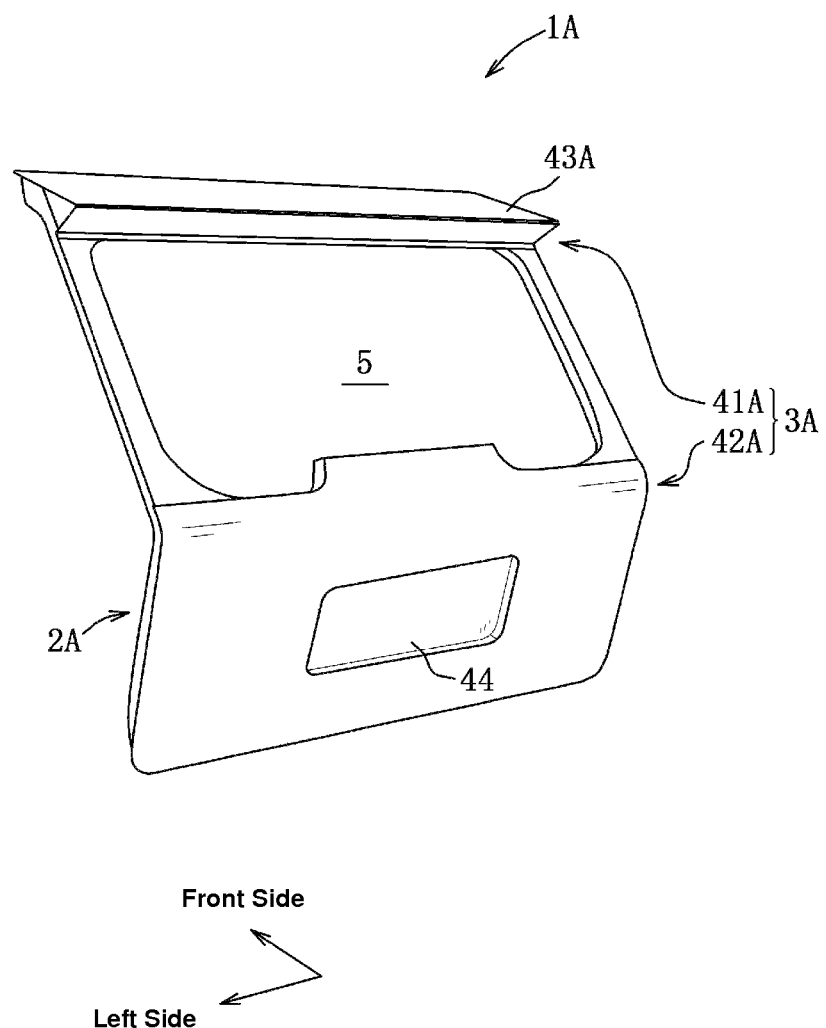
FIG. 16 is a perspective view of a lift gate according to a second embodiment of the present invention, when viewed from the vehicle rear.
Figure 17:
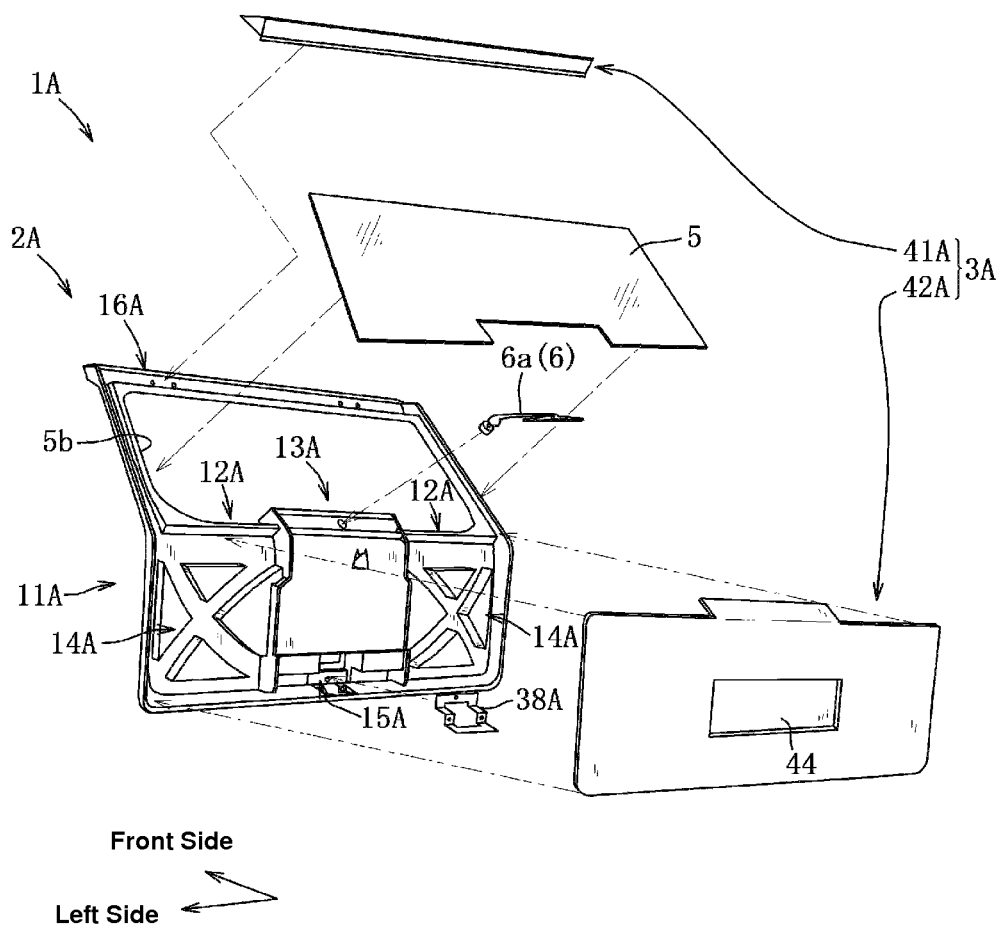
FIG. 17 is an exploded perspective view of the lift gate, when viewed from the vehicle rear.
Figure 18:
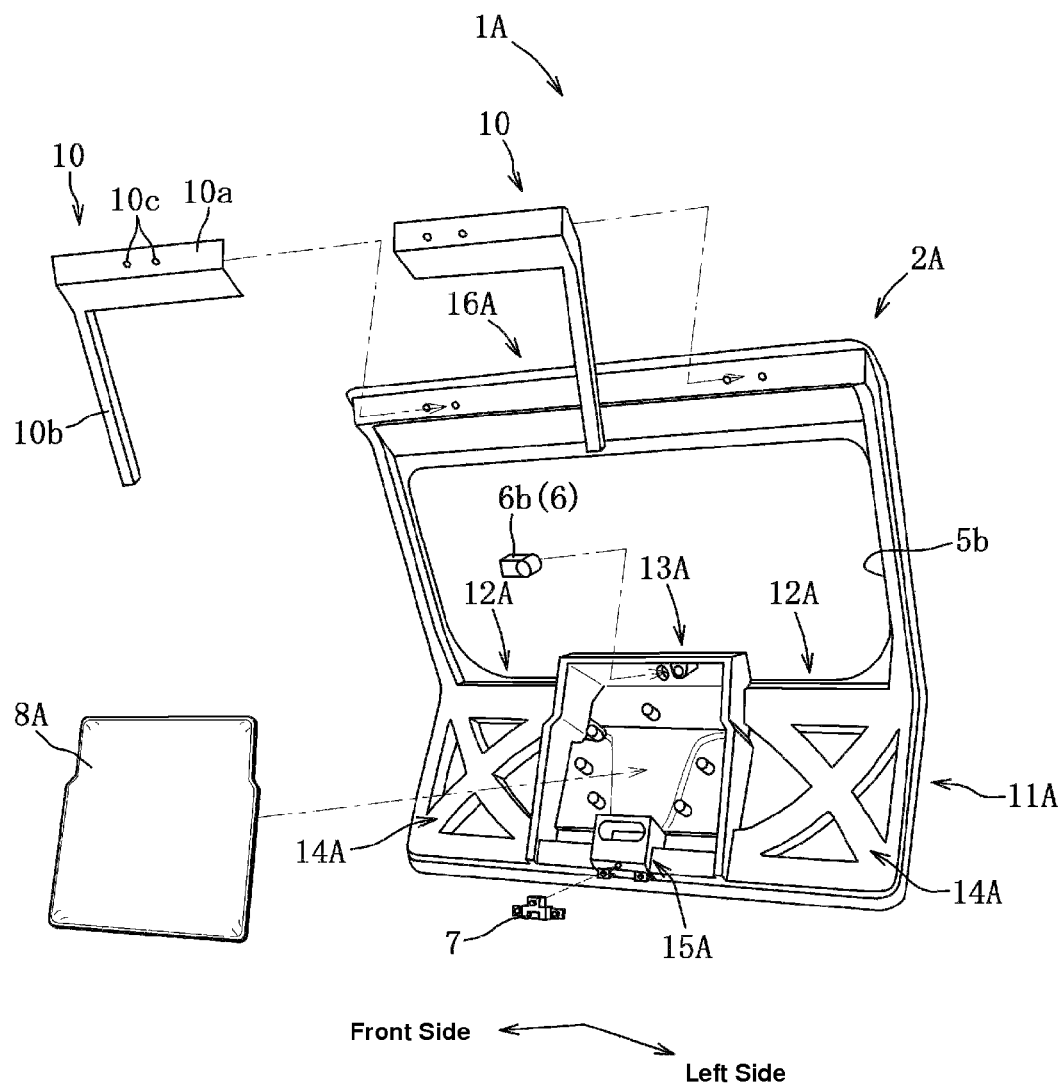
FIG. 18 is an exploded perspective view of the lift gate, when viewed from the vehicle front.
Figure 19:
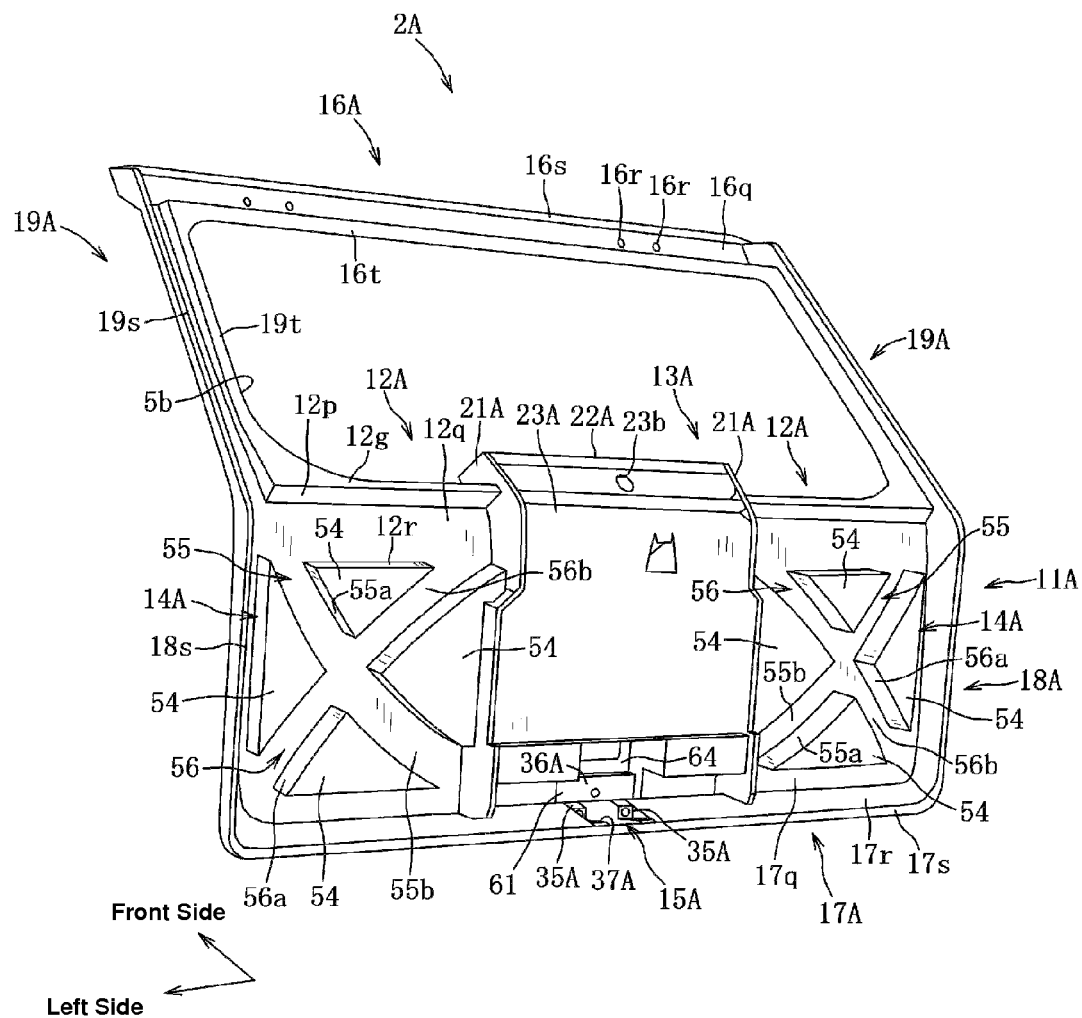
FIG. 19 is a perspective view of an inner panel, when viewed from the vehicle rear.
Figure 20:
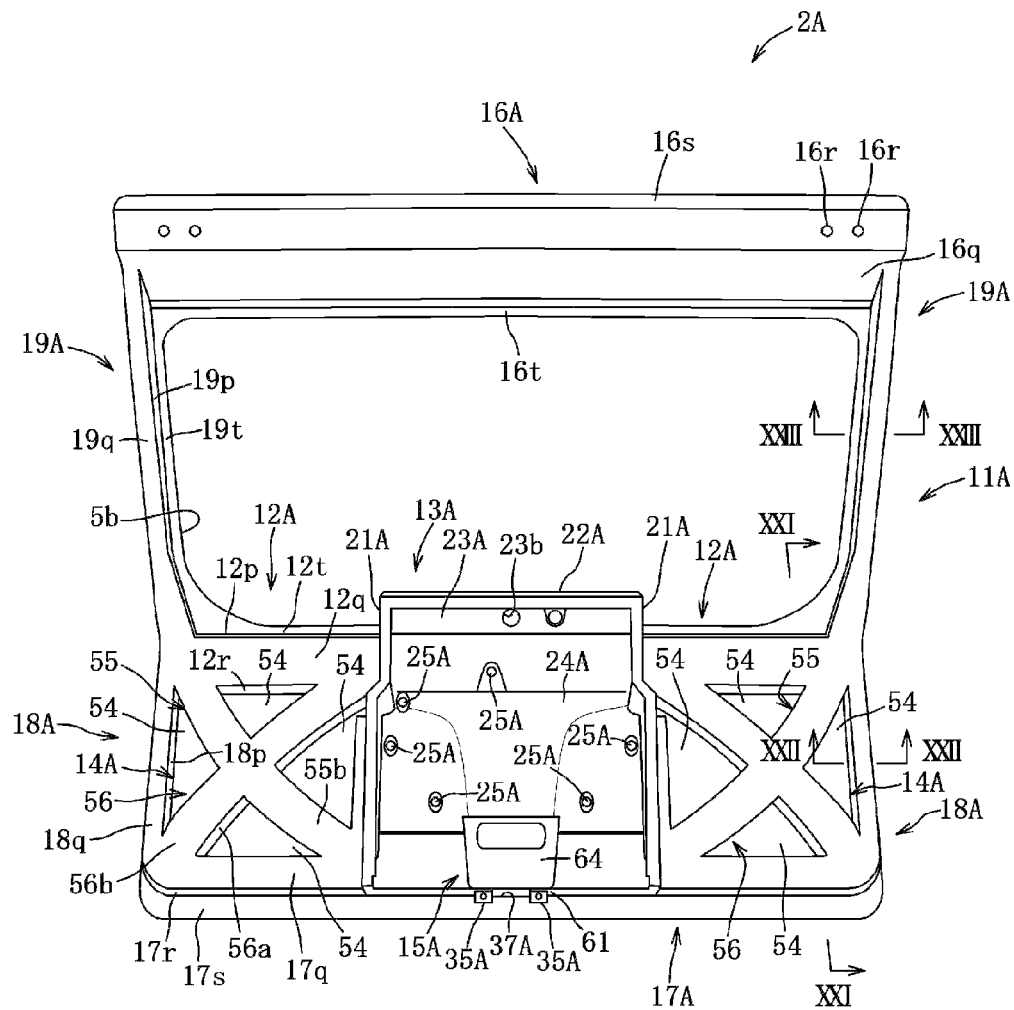
FIG. 20 is an elevational view of the inner panel.

As shown in FIGS. 16-18, the lift gate 1A comprises an inner panel 2A, an outer panel 3A, the rear windowpane (window glass) 5 and others, and is formed in a substantially L shape in the side view. The lift gate 1A is manufactured in such a manner that the inner panel 2A is formed, then the outer panel 3A, the pair of hinge attachment portions 10 and the rear window glass 5 are attached to the inner panel 2A, respectively, and finally the power unit mechanism 6, the latch mechanism 7, the trim member 8 and others are installed.

As shown in FIGS. 17-20, the inner panel 2A comprises an outer-frame forming portion 11A, a pair of right-and-left inner-frame forming portions 12A, a mechanism storage portion 13A, a right-and-left panel portions 14A, a latch storage portion 15A, an upper end frame portion 16A and others, which are integrally formed by an injection forming. The outer-frame forming portion 11A is formed to have a U-shaped cross section $U_{11A}$ such that an opening thereof is directed toward the vehicle rear, and comprises a pair of plural flange walls and a bottom wall which connects end portions of the flange walls. The U-shaped cross section of the outer-frame forming portion 11A extends continuously around the inner panel 2A.

Figure 21:
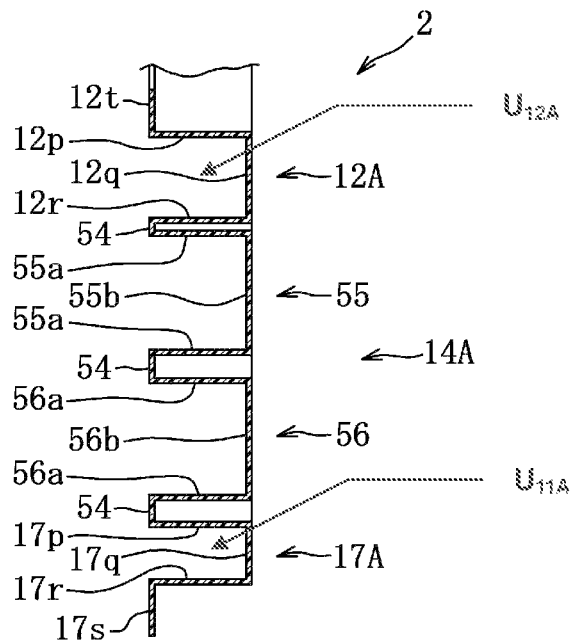
FIG. 21 is a sectional view taken along line XXI-XXI of FIG. 20.
Figure 22:
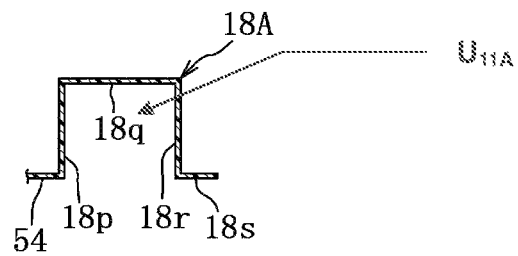
FIG. 22 is a sectional view taken along line XXII-XXII of FIG. 20.

As shown in FIGS. 19-25, the outer-frame forming portion 11A comprises a lower end frame portion 17A, a right-and-left side edge frame portions 18A, and others. As shown in FIG. 21, the lower end frame portion 17A comprises an upper side frame wall 17*p*, a lower flange wall 17*r*, a bottom wall 17*q* which connects front end portions of the flange walls 17*p*, 17*r*, and an outer edge end portion 17*s* which projects downwardly from a rear end portion of the lower flange wall 17*r*.

A left side edge frame portion 18 comprises an inside flange wall 18*a* which connects to a left end portion (an outside end portion in the vehicle width direction) of the upper flange wall 17*p* and extends upwardly, a bottom wall 18*q* which connects to a left end portion of the bottom wall 17*q* and connects perpendicularly to a front end portion of the inside flange wall 18*p*, an outside flange wall 18*r* which extends toward the vehicle rear from a left end portion of the bottom wall 18*q*, and an outer edge end portion 18*s* which connects to a left end portion of the outer edge end portion 17*a* and projects outwardly from a rear end portion of the outside flange wall 18*r*. The right side edge frame portion 18A is formed symmetrically relative to the left side edge frame portion 18A.

Figure 23:
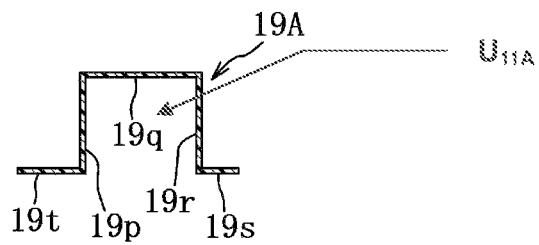
FIG. 23 is a sectional view taken along line XXIII-XXIII of FIG. 20.

The pair of side edge frame portions 18A includes a pair of right-and-left pillar portions 19A which is formed in a forwardly-and-upwardly slant shape above the inner-frame forming portion 12A. As shown in FIG. 23, the left pillar portion 19A comprises an inside flange wall 19*p* which connects to an upper end portion of the inside flange wall 18*p* and extends upwardly, a bottom wall 19*q* which connects to upper end portions of the bottom wall 18*q* and connects perpendicularly to a front end portion of the inside flange wall 19*p*, an outside flange wall 19*r* which connects to an upper end portion of the outside flange wall 18*r* and extends toward the vehicle rear from a left end portion of the bottom wall 19*q*, an outer edge end portion 19*s* which connects to an upper end portion of the outer edge end portion 18*s* and projects outwardly in the vehicle width direction from a rear end portion of the outside flange wall 19*r*, and an inner edge end portion 19*t* which projects inwardly in the vehicle width direction from a rear end portion of the inside flange wall 19*p*. The right pillar portion 19A is formed symmetrically relative to the left pillar portion 19A. Thus, the outer-frame forming portion 11A is formed in a U shape along the inner panel 2A such that the respective bottom walls 17*q*, 18*q*, 19*q* are arranged on the front side and the respective flange walls 17*p*, 17*r*, 18*p*, 18*r*, 19*p*, 19*r* have opening thereof being directed toward the vehicle rear.

As shown in FIG. 21, the left inner-frame forming portion 12A, which is formed to have a U-shaped cross section $U_{12A}$ such that an opening thereof is directed toward the vehicle rear, comprises a pair of upper-and-lower flange walls 12*p*, 12*r*, a bottom wall 12*q* which interconnects front end portions of the flange walls 12*p*, 12*r* and connects to the inside flange wall 18*q*, and an inner edge end portion 12*t* which projects upwardly from a rear end portion of the upper flange wall 12p. The upper flange wall 12p of the left inner-frame forming portion 12A connects to the inside flange wall 19p of the left pillar portion 19A, and the inner edge end portion 12t connects to the inner edge end portion 19t. The right inner-frame forming portion 12A is formed symmetrically relative to the left inner-frame forming portion 12A. The respective U-shaped cross sections $U_{12A}$ of the pair of inner-frame forming portions 12A are continuous from the respective U-shaped cross sections of the outer-frame forming portions 11A.

As shown in FIGS. 17-20, 24, and 25, the mechanism storage portion 13A comprises a pair of right-and-left vertical wall portions 21A which projects forwardly from a front portion of the inner panel 2A, a lateral wall portion 22A which projects forwardly from the front portion of the inner panel 2A, a panel portion 23A, a rib portion 24A which projects forwardly from the panel portion 23A, plural projection portions 25A which project forwardly from the panel portion 23A, and others. The pair of vertical wall portions 21A is connected to respective inward end portions of the pair of inner-frame forming portions 12A at a midway position of the inner panel 2A. Each of the respective vertical portions 21A is formed to partition a space formed between the side edge frame portion 18A and the wiper unit mechanism 6 into a left side and a right side, and extends from the lower edge portion of a window opening portion 5b to the bottom wall 17q of the lower end frame portion 17A.

Figure 24:
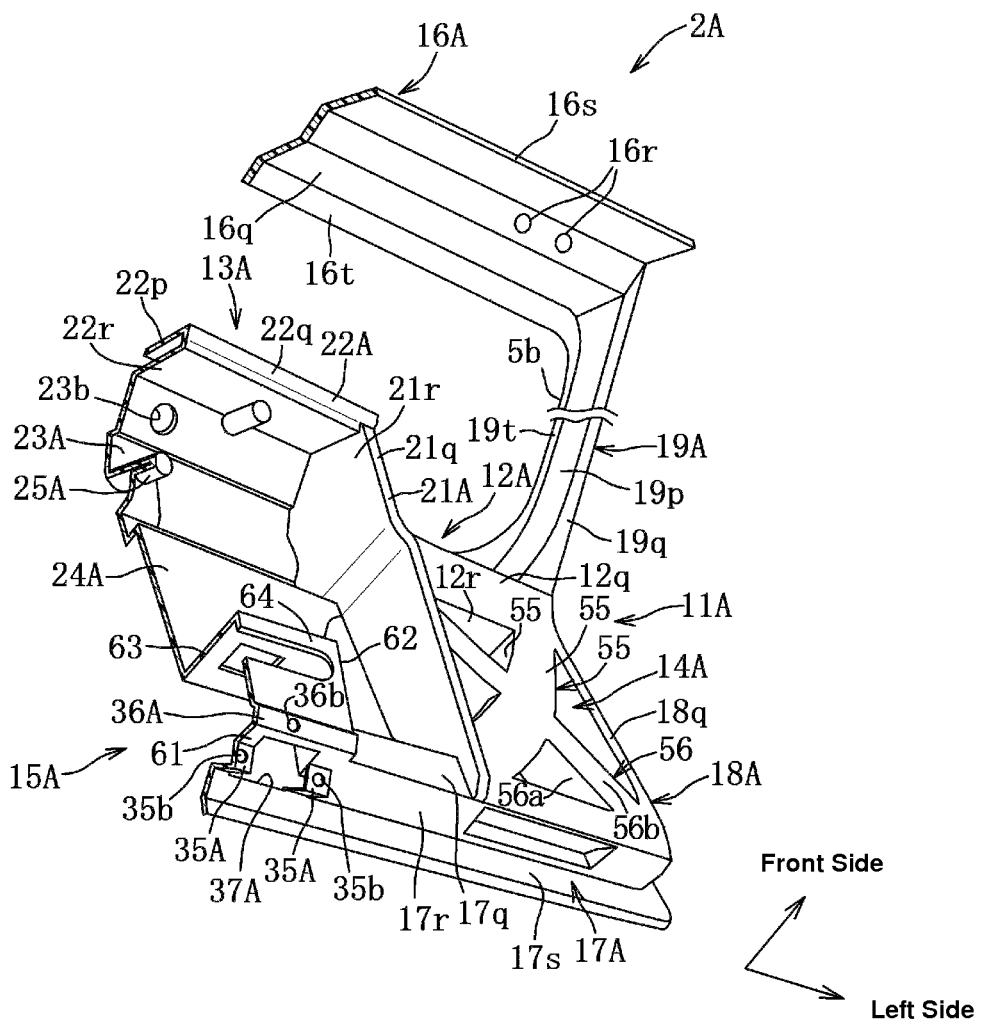
FIG. 24 is a vertical sectional perspective view of the inner panel.
Figure 25:
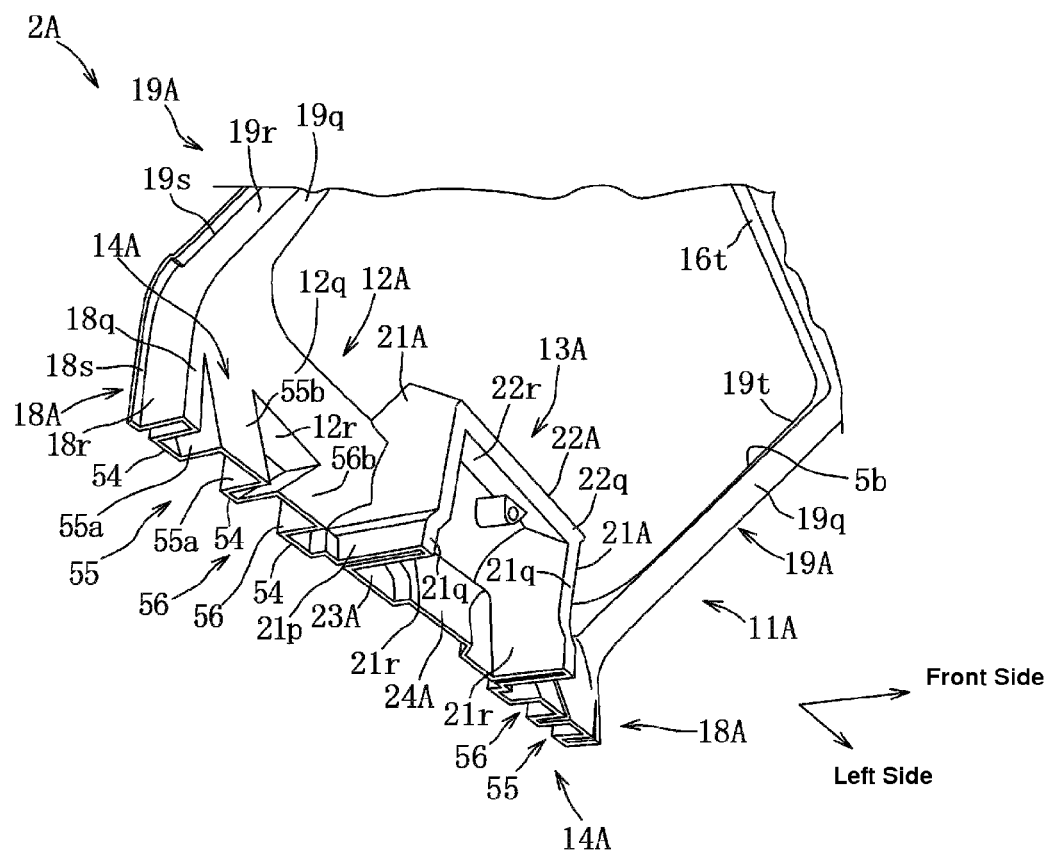
FIG. 25 is a lateral sectional perspective view of the inner panel.

As shown in FIG. 25, each of the vertical wall portions 21A is formed to have a U-shaped cross section such that an opening thereof is directed toward the vehicle rear, and comprises an outside flange wall 21p provided on the vehicle outside, an inside flange wall 21r provided adjacently to outside flange wall 21p in the vehicle width direction, and a bottom wall 21q provided to interconnect respective front end portions of the flange walls 21p, 21r. The inside end portions, in the vehicle width direction, of the pair of inner-frame forming portions 12A are connected to the both of the outside flange walls 21p. As shown in FIG. 24, the lateral wall portion 22A is formed to have a U-shaped cross section such that an opening thereof is directed toward the vehicle rear, and comprises an upper flange wall 22p which extends between the both outside flange walls 21p and extends in the vehicle width direction, a lower flange wall 22r which extends between the both inside flange walls 21r and extends in the vehicle width direction, and a bottom wall 22r which interconnects respective front end portions of the upper and lower flange walls 22p, 22r and connects to the bottom wall 21q.

The panel portion 23A is configured to respectively connect perpendicularly to respective rear ends of the upper flange wall 17p, the inside flange wall 21r, and the lower flange wall 22r. The panel portion 23A has an opening 23b for connection of the wiper portion 6a to the drive portion 6b of the wiper unit mechanism 6, the reinforcing rib portion 24A, and the six projection portions 25A, and others. The rib portion 24A is formed to protrude forwardly from the front portion of the panel portion 23A and extend upwardly from the latch storage portion 15A, which will be described, with its width becoming wider. An upper end of the rib portion 24A is connected to the respective inside flange walls 21r. Herein, the rib portion 24A may be comprised of plural portions.

After the drive portion 6b of the wiper unit mechanism 6, the latch mechanism 7, the lamp mechanism and the like are installed inside the mechanism storage portion 13, a front side (vehicle-compartment side) of the mechanism storage portion 13A enclosed by the lower end frame portion 17A, the pair of vertical wall portions 21A, and the lateral wall portion 22A is covered with the trim member 8A. As shown in FIG. 18, the trim member 8A is attached to the bottom wall 17q and the pair of right-and-left bottom walls 21q, 22q from the front side by clips (not illustrated).

As shown in FIGS. 17-21, 24 and 25, the pair of right-and-left panel portions 14A is arranged on the both sides of the mechanism storage portion 13A, and formed to cover a portion enclosed by the outer-frame forming portion 11A, the inner-frame forming portion 12A, and the mechanism storage portion 13A. Four outside panel portions 54, which are of a triangular shape and arranged on the upper, lower, right and left sides, and reinforcement portions 55, 56 as the inside panel portion are formed integrally with the pair of panel portions 14A, respectively. The reinforcement portions 55, 56 are configured such that the reinforcement portion 55 extends obliquely upwardly and outwardly and the reinforcement portion 56 extends obliquely upwardly and inwardly, so that these portions 55, 56 cross each other at their middle portions in an X shape.

The four outside panel portions 54 project toward the vehicle rear beyond bottom walls 55b, 56b of the reinforcement portions 55, 56, and contact the front portion of the outer panel 3A. An upper end portion of the upper outside panel portion 54 connects to a rear end portion of the lower flange wall 12r, a lower end portion of the lower outside panel portion 54 connects to a rear end portion of the upper flange wall 17p, an outside end portion of the outward outside panel portion 54 connects to a rear end portion of the inside flange wall 18p, and an inward end portion of the inward outside panel portion 54 connects to a rear end portion of the outside flange wall 21p.

The reinforcement portion 55 is configured such that its upper end connects to an outside of the inner-frame forming portion 12A and its lower end connects to an inside of the lower end frame portion 17A, and to have a U-shaped cross section such that its opening is directed toward the vehicle rear. The reinforcement portion 55 comprises a pair of right-and-left flange walls 55a and the bottom wall 55b interconnecting respective front end portions of the flange walls 55a. Thus, the U-shaped cross section of the reinforcement portion 55 is continuous to the U-shaped cross section of the pillar portion 19A and the U-shaped cross section of the inner-frame forming portion 12A at its upper end, and also continuous to the U-shaped cross section of the lower frame portion 17A at its lower end. The rear end portion of the inside flange wall 55a is continuous to a rear end portion of the upper outside panel portion 54 on the outside in the vehicle width direction, and continuous to a rear end portion of the inward outside panel portion 54 on the lower side. The rear end portion of the outside flange wall 55a is continuous to a rear end portion of the lower outside panel portion 54 on the inside in the vehicle width direction, and continuous to a rear end portion of the outward outside panel portion 54 on the upper side.

The reinforcement portion 56 is configured such that its upper end connects to an inside of the inner-frame forming portion 12A and its lower end connects to an outside of the lower end frame portion 17A, and to have a U-shaped cross section such that its opening is directed toward the vehicle rear. The reinforcement portion 56 comprises a pair of right-and-left flange walls 56a and the bottom wall 56b interconnecting respective front end portions of the flange walls 56a. Thus, the U-shaped cross section of the reinforcement portion 56 is continuous to the U-shaped cross section of the inner-frame forming portion 12A at its upper end, and also continuous to the U-shaped cross section of the lower frame portion 17A and the U-shaped cross section of the side edge frame portion 18A at its lower end. The rear end portion of the outside flange wall 56a is continuous to a rear end portion of the upper outside panel portion 54 on the inside in the vehicle width direction, and continuous to a rear end portion of the outward outside panel portion 54 on the lower side. The rear end portion of the inside flange wall 56a is continuous to a rear end portion of the lower outside panel portion 54 on the outside in the vehicle width direction, and continuous to a rear end portion of the inward outside panel portion 54 on the upper side.

Accordingly, since the inner-frame forming portion 12A and the lower end frame portion 17A are interconnected by the X-shaped reinforcement portions 55, 56, the rigidity of the lift gate 1A can be increased, so that the bending or torsional stresses inputted to the lift gate 1A can be efficiently supported by utilizing the reinforcement portions 55, 56. Further, since the outside panel portions 54 have the face contact with the outer panel 3A when the outer panel 3A is assembled to the inner panel 2A, the face rigidity of the outer panel 3A can be increased by using the face rigidity of the inner panel 2A.

As shown in FIGS. 17-20, 24 and 26, the latch storage portion 15A is formed to protrude forwardly from the panel portion 23A of the mechanism storage portion 13A and arranged at a specified position which is located below the panel portion 23a and at the central position in the vehicle width direction. The latch storage portion 15A includes integrally a lower storage wall 61 provided to connect to the lower flange wall 17r, a pair of right-and-left side storage walls 62, an upper storage wall 63, and a front storage wall 64, and forms a space for storing latch mechanism between that and the outer panel 3A, where at least part of the latch mechanism 7 including the actuator 7a and others is stored. The pair of side storage walls 62 perpendicularly projects forwardly from a front portion of the panel portion 23A, the upper storage wall 63 perpendicularly projects forwardly from a front portion of the rib portion 24A, and the lower storage wall 61 projects forwardly from a rear portion of the lower flange wall 17r. The front storage wall 64 is formed perpendicularly to the lower storage wall 61, the pair of side storage walls 62, and the upper storage wall 63.

Figure 26:
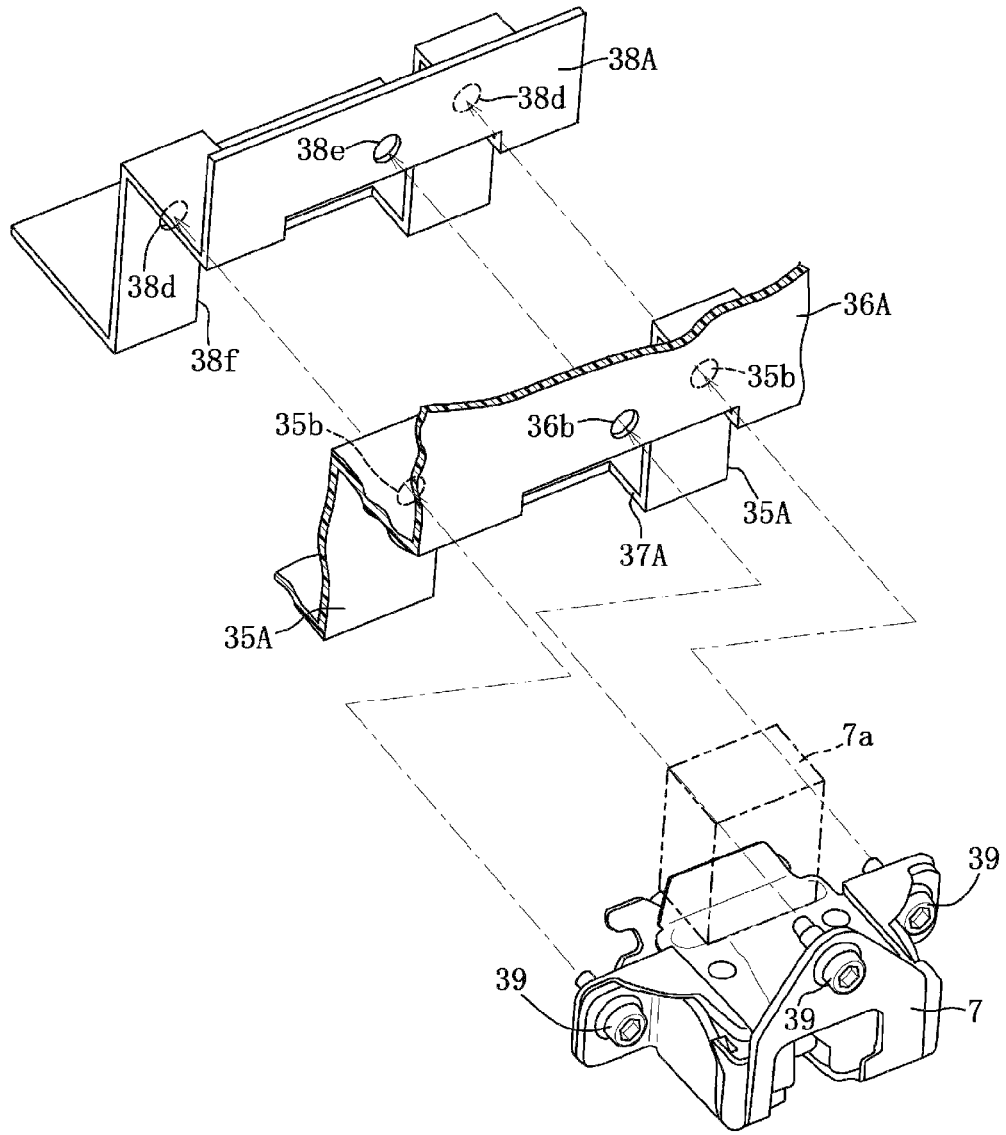
FIG. 26 is an exploded perspective view of a latch mechanism.

As shown in FIGS. 24 and 26, the lower storage wall 61 has a pair of right-and-left first attaching seat portions 35A, a second attaching seat portion 36A, and an opening for latch 37A for attaching the latch mechanism 7 to the inner panel 2A. The pair of right-and-left first attaching seat portions 35A is provided to be away from each other with a specified distance in the vehicle width direction and protrude forwardly from a rear portion of the lower flange wall 17r, having a triangular cross section. The first attaching seat portion 35A has a bolt hole 35b for attaching the latch mechanism 7 at its front portion. The second attaching seat portion 36A is formed at a specified position which corresponds between the pair of first attaching seat portions 35A and is located above the first attaching seat portion 35A. The second attaching seat portion 36A has a bolt hole 36b for attaching the latch mechanism 7 at its front portion.

A latch-mechanism attaching bracket 38A is provided in back of the lower storage wall portion 61. As shown in FIG. 26, the latch-mechanism attaching bracket 38A is formed by bending a metal plate in a W shape. The latch-mechanism attaching bracket 38A has a pair of first bolt holes 38d, a second bolt hole 38e, and an opening portion for latch 38f. The latch-mechanism attaching bracket 38A is configured to be assembled to the pair of right-and-left first attaching seat portions 35A and the second attaching seat portion 36A from the rear side. When the latch-mechanism attaching bracket 38A is assembled to the first attaching seat portions 35A and the second attaching seat portion 36A, the pair of first bolt holes 38d, the second bolt hole 38e, and the opening portion for latch 38f are provided so as to correspond to the pair of bolt holes 35b, the bolt hole 36b, and the opening portion for latch 37A, respectively.

As shown in FIGS. 17-20, and 24, the upper end frame portion 16A is integrally formed with the outer-frame forming portion 11A by interconnecting the upper end portions of the pair of right-and-left pillar portions 19A. The upper end frame portion 16A comprises a body portion 16q, a pair of right-and-left hinge attaching holes 16r which is provided at both end portions of the body portion 16q, an outer edge end portion 16s formed at an upper portion, and an inner edge end portion 16t formed at a lower portion. Accordingly, the window opening portion 5b is formed by the lateral wall portion 22A and the inner edge frame portions 12t, 16t, 19t, and the rear window glass 5 adheres to the inner edge frame portions 12t, 16t, 19t from the vehicle rear by using an adhesive.

Figure 27:
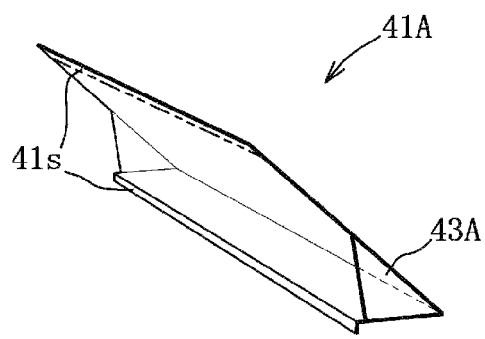
FIG. 27 is a perspective view of an upper outer panel portion.

As shown in FIGS. 16, 17, 27 and 28, the outer panel 3A is comprised of two split members of an upper outer panel portion 41A and a lower outer panel portion 42A. As shown in FIG. 27, the upper outer panel portion 41A comprises an outer edge end portion 41s provided at upper and lower portions thereof and a spoiler portion 43A which projects rearward, which are integrally made by the injection forming. The upper outer panel portion 41A forms a triangular closed cross section portion together with the upper end frame portion 16A.

Figure 28:
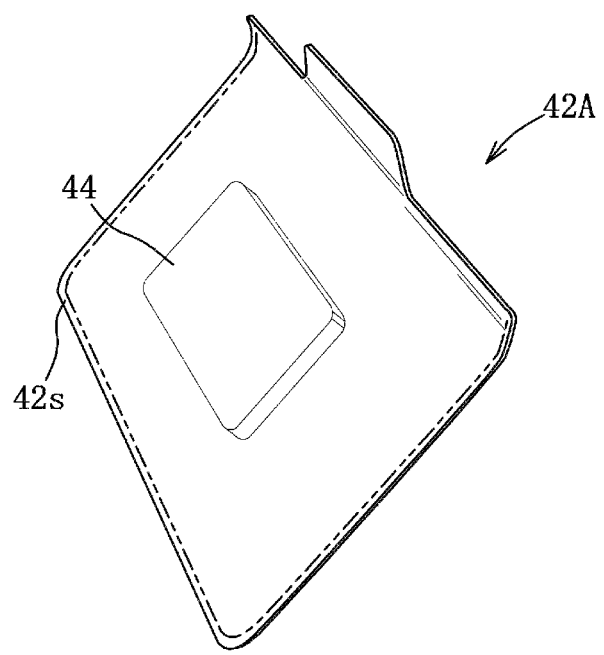
FIG. 28 is a perspective view of a lower outer panel portion.

As shown in FIG. 28, the lower outer panel portion 42A, which is integrally formed in a rectangular shape, includes an outer edge end portion 42s formed at its right-and-left end portions and its lower end portion and a license-plate attachment portion 44A formed at a central position of its rear portion. Since the front portion of the lower outer panel portion 42A has the face contact with the rear portion of the outside panel portion 54 when the lower outer panel portion 42A is assembled, the film vibration surface vibrations of the lower outer panel portion 42a which may be caused by the vehicle-body vibration or the dent which may be caused by pressing during opening or closing the lift gate 1A can be restrained generating.

The operations and effects of the structure of the lift gate for a vehicle according to the second embodiment will be described. The present structure of the lift gate for a vehicle can basically provide the similar operations and effects to the first embodiment. Further, since the reinforced portions 55, 56 having the U-shaped cross section and connecting to the outer-frame forming portion 11A and the inner-frame forming portion 12A is formed at the inside panel portion, the bending and torsional stresses inputted to the outer-frame forming portion 11A and the inner-frame forming portion 12A can be efficiently supported and absorbed by the whole part of the inner panel 2A.

Since the plural reinforcement portions 55, 56 are provided over the lower end frame portion 17A of the outer-frame forming portion 11A and the inner-frame forming portion 12A, and these reinforcement portions 55, 56 cross each other, a cross-shaped stress support portion can be formed between the inner-frame forming portion 12A and the lower end frame portion 17A, so that the bending and torsional stresses inputted to the inner-frame forming portion 12A and lower end frame portion 17A can be efficiently supported by the whole part of the inner panel 12A, and the face rigidity of the outer panel 3A can be further increased.

Since the inner panel 12A includes the pair of vertical wall portions 21A which connects to the inner-frame forming portion 12A at the midway position thereof in the vehicle width direction and partitions the space formed between the outer-frame forming portion 11A and the wiper unit mechanism 6 into the left side and the right side, and the outside panel portion 54 and the reinforcement portions 55, 56 are formed on the outside, in the vehicle width direction, of the pair of vertical wall portions 21A, the inner-frame forming portion 12A can be reinforced by using the pair of vertical wall portions 21A partitioning the space formed between the outer-frame forming portion 12A and the wiper unit mechanism 6 into the left side and the right side. Accordingly, the bending and torsional stresses inputted to the inner-frame forming portion 12A can be supported by the whole part of the inner panel 2A via the pair of vertical wall portions 21A, thereby increasing the rigidity of the lift gate 1A further. Further, the outside panel portion 54 and the reinforcement portions 55, 56 can be efficiently arranged at the face portion of the outer panel 3A, thereby providing the lightweight structure.

Since the lateral wall portion 22A interconnecting the upper end portions of the pair of vertical wall portions 21A is formed, and the trim member 8A covering over a specified portion on the vehicle-compartment side which is enclosed by the lateral wall portion 22A, the pair of vertical wall portions 21A, and the lower end frame portion 17A of the outer-frame forming portion 11A is provided, the mechanism portion stored in the mechanism storage portion 13A can be covered with the trim member 8A, thereby improving the lightweight structure and the product values. Since the vertical wall portions 21A and the lateral wall portion 22A are formed to have the U-shaped cross section such that the opening thereof is directed toward the vehicle outside, the rigidity of the vertical wall portions 21A and the lateral wall portion 22A can be increased without increasing the plate thickness, thereby increasing the rigidity of the lift gate further.

Subsequently, some partially-modified embodiments will be described.

1) While the examples of the hatch back type of passenger vehicle were explained in the above-described first and second embodiments, the present invention is applicable to any type of vehicles equipped with a lift gate at the vehicle's rear portion, including a one-box type of passenger vehicle. Further, while the example of the outer panel comprised of the split upper outer panel portion and the split lower outer panel portion was explained, an outer panel which is comprised of the upper and lower outer panel portions which are formed integrally is applicable as well as an outer panel comprised of three split panels.

2) While the examples in which the front portion of the lower outer panel portion contacts the rear portion of the outside panel portion were explained in the above-described first and second embodiments, the outside panel portion may be disposed closely away from the front portion of the outer panel as long as at least the surface vibrations or dent of the lower outer panel portion can be restrained. In this case, the face portion of the outer panel which is deformed in accordance with the surface vibrations or detent contacts the outside panel portion, so that further generation of the film vibration or dent can be restrained. Further, a shock absorbing material or the like may be disposed between the front portion of the lower outer panel portion and the rear portion of the outside panel portion.

3) While the example in which the slant-shaped reinforcement portions extending obliquely upwardly and outwardly and the slant-shaped reinforcement portions extending obliquely upwardly and inwardly are provided to cross each other at the both sides was explained in the above-described second embodiment, one of them may be arranged vertically and the other may be arranged horizontally such that they are provided to cross each other perpendicularly at the both sides. Further, a single reinforcement portion may be arranged at each side, and three or more reinforcement portions may be arranged at each side.

4) The present invention should not be limited to the above-described embodiments or modifications, and any other further modifications or improvements may be applied within the scope of a spirit of the present invention.

What is claimed is:

1. A structure of a lift gate for a vehicle, which is provided to open or close an opening portion formed at a rear portion of the vehicle, comprising:

a windowpane;

a synthetic-resin made inner panel including a window opening portion where the windowpane is attached; and a synthetic-resin made outer panel adhering to a vehicle outside of the inner panel, wherein said inner panel includes:

an outer-frame forming portion which comprises a pair of side edge frame portions including a pair of right-and-left pillar portions and a lower end frame portion integrally formed at the side edge frame portions and has a U-shaped cross section such that an opening thereof is directed toward the vehicle outside;

an inner-frame forming portion which is formed at a lower edge portion of the window opening portion to connect to the outer-frame forming portion and has a U-shaped cross section such that an opening thereof is directed toward the vehicle outside; and a panel portion which covers over a specified portion enclosed by the outer-frame forming portion and the inner-frame forming portion, the panel portion comprising an outside panel portion which is provided to contact said outer panel or be positioned close to said outer panel and an inside panel portion which is integrally formed at the outside panel portion to connect to the outside panel portion and project toward a vehicle-compartment side beyond the outside panel portion, and said inner panel includes a pair of vertical wall portions which connects to the inner-frame forming portion at a midway position thereof in a vehicle width direction and partitions a space formed between the outer-frame forming portion and a mechanism portion installed to the lift gate into a left side and a right side, said pair of vertical wall portions is formed to have a U-shaped cross section such that an opening thereof is directed toward the vehicle outside, and said outside panel portion is formed to be continuous to at least two adjacent portions among said vertical wall portions, inner-frame forming portion, side edge frame portions, and lower end frame portion of the inner panel.

2. The structure of a lift gate for a vehicle of claim 1, wherein said outside panel portion is formed to extend toward an outside in the vehicle width direction and be continuous to said vertical wall portions, inner-frame forming portion, and side edge frame portions of the inner panel.

3. A structure of a lift gate for a vehicle, which is provided to open or close an opening portion formed at a rear portion of the vehicle, comprising:

a windowpane;

a synthetic-resin made inner panel including a window opening portion where the windowpane is attached; and a synthetic-resin made outer panel adhering to a vehicle outside of the inner panel, wherein said inner panel includes:

an outer-frame forming portion which comprises a pair of side edge frame portions including a pair of right-and-left pillar portions and a lower end frame portion integrally formed at the side edge frame portions and has a U-shaped cross section such that an opening thereof is directed toward the vehicle outside;

an inner-frame forming portion which is formed at a lower edge portion of the window opening portion to connect to the outer-frame forming portion and has a U-shaped cross section such that an opening thereof is directed toward the vehicle outside; and a panel portion which covers over a specified portion enclosed by the outer-frame forming portion and the inner-frame forming portion, the panel portion comprising an outside panel portion which is provided to contact said outer panel or be positioned close to said outer panel and an inside panel portion which is integrally formed at the outside panel portion to connect to the outside panel portion and project toward a vehicle-compartment side beyond the outside panel portion, and a reinforcement portion which connects to said outer-frame forming portion and said inner-frame forming portion and has a U-shaped cross section is formed at said inside panel portion.

4. The structure of a lift gate for a vehicle of claim 3, wherein said reinforcement portion is comprised of plural portions which are provided over the lower end frame portion of said outer-frame forming portion and said inner-frame forming portion, and the plural portions cross each other.

5. The structure of a lift gate for a vehicle of claim 3, wherein said inner panel includes a pair of vertical wall portions which connects to the inner-frame forming portion at a midway position thereof in a vehicle width direction and partitions a space formed between the outer-frame forming portion and a mechanism portion installed to the lift gate into a left side and a right side, and said outside panel portion and said reinforcement portion are formed on an outside, in a vehicle width direction, of said pair of vertical wall portions.

6. The structure of a lift gate for a vehicle of claim 4, wherein said inner panel includes a pair of vertical wall portions which connects to the inner-frame forming portion at a midway position thereof in a vehicle width direction and partitions a space formed between the outer-frame forming portion and a mechanism portion installed to the lift gate into a left side and a right side, and said outside panel portion and said reinforcement portion are formed on an outside, in a vehicle width direction, of said pair of vertical wall portions.

7. The structure of a lift gate for a vehicle of claim 1, wherein a lateral wall portion interconnecting upper end portions of said pair of vertical wall portions is formed, and a trim member covering over a specified portion on the vehicle-compartment side which is enclosed by said lateral wall portion, the pair of vertical wall portions, and the lower end frame portion of said outer-frame forming portion is provided.

8. The structure of a lift gate for a vehicle of claim 5, wherein a lateral wall portion interconnecting upper end portions of said pair of vertical wall portions is formed, and a trim member covering over a specified portion on the vehicle-compartment side which is enclosed by said lateral wall portion, the pair of vertical wall portions, and the lower end frame portion of said outer-frame forming portion is provided.

9. The structure of a lift gate for a vehicle of claim 7, wherein said vertical wall portions and said lateral wall portion are formed to have a U-shaped cross section such that an opening thereof is directed toward the vehicle outside.

10. The structure of a lift gate for a vehicle of claim 8, wherein said vertical wall portions and said lateral wall portion are formed to have a U-shaped cross section such that an opening thereof is directed toward the vehicle outside.

11. A structure of a lift gate for a vehicle, which is provided to open or close an opening portion formed at a rear portion of the vehicle, comprising:

a windowpane;

a synthetic-resin made inner panel including a window opening portion where the windowpane is attached; and a synthetic-resin made outer panel adhering to a vehicle outside of the inner panel, wherein said inner panel includes:

an outer-frame forming portion which comprises a pair of side edge frame portions including a pair of right-and-left pillar portions and a lower end frame portion integrally formed at the side edge frame portions and has a U-shaped cross section such that an opening thereof is directed toward the vehicle outside;

an inner-frame forming portion which is formed at a lower edge portion of the window opening portion to connect to the outer-frame forming portion and has a U-shaped cross section such that an opening thereof is directed toward the vehicle outside; and a panel portion which covers over a specified portion enclosed by the outer-frame forming portion and the inner-frame forming portion, the panel portion comprising an outside panel portion which is provided to contact said outer panel or be positioned close to said outer panel and an inside panel portion which is integrally formed at the outside panel portion to connect to the outside panel portion and project toward a vehicle-compartment side beyond the outside panel portion, and an outer edge end portion of said outer panel adheres to at least an outer edge end portion of a lower portion of said outer-frame forming portion, and an upper end frame portion which integrally interconnects both-side upper end portions of said outer-frame forming portion and forms a closed cross section portion with said outer panel is provided.

12. The structure of a lift gate for a vehicle of claim 11, wherein openings are formed at an upper flange wall and a lower flange wall of said lower end frame portion to face to each other and a cylindrical inner handle member is provided to penetrate said openings.

* * * * *